US012756007B2

(12) # United States Patent
Jan et al.

(10) Patent No.: US 12,756,007 B2
(45) Date of Patent: Oct. 6, 2026

(54) CROSSLINKER FOR ELECTROLYTE, ELECTROLYTE COMPOSITIONS AND LITHIUM-ION BATTERY INCLUDING THE SAME

(71) Applicant: NATIONAL CHENG KUNG UNIVERSITY, Tainan City (TW)

(72) Inventors: Jeng-shiung Jan, Tainan City (TW); Yu-chao Tseng, Tainan City (TW); Shih-hsien Hsiang, Tainan City (TW)

(73) Assignee: NATIONAL CHENG KUNG UNIVERSITY, Tainan City (TW)

( * ) Notice: Subject to any disclaimer, the term of this patent is extended or adjusted under 35 U.S.C. 154(b) by 775 days.

(21) Appl. No.: 17/999,014

(22) PCT Filed: Jun. 30, 2020

(86) PCT No.: PCT/CN2020/099322
§ 371 (c)(1),
(2) Date: Nov. 16, 2022

(87) PCT Pub. No.: WO2022/000275
PCT Pub. Date: Jan. 6, 2022

(65) Prior Publication Data

US 2023/0231189 A1 Jul. 20, 2023

(51) Int. Cl.
*H01M 10/0565* (2010.01)
*H01M 4/38* (2006.01)
(Continued)

(52) U.S. Cl.
CPC ....... *H01M 10/0565* (2013.01); *H01M 4/382* (2013.01); *H01M 4/5825* (2013.01);
(Continued)

(58) Field of Classification Search
CPC ............. H01M 10/0565; H01M 4/382; H01M 4/5825; H01M 10/0525; H01M 2004/027;
(Continued)

(56) References Cited

FOREIGN PATENT DOCUMENTS

| | | | |
|---|---|---|---|
| CN | 1990525 | A | 7/2007 |
| CN | 101752090 | A | 6/2010 |
| CN | 102050919 | A | 5/2011 |
| CN | 102716727 | A | 10/2012 |

(Continued)

OTHER PUBLICATIONS

Li et al. "Radiation Synthesis and Properties of Imidazolium Hexafluorophosphate Poly(ionic liquid) Gel Electrolytes" Acta Polymerica Sinica, Mar. 2018, No. 3, pp. 349-355 (Year: 2018).*

Kim et al.("Unique X-ray Sheet Structure of 1,8- Bis(imidazolium) Anthracene and Its Application as a Fluorescent Probe for DNA and DNase" Org. Lett. 2011 vol. 13, No. 6 (1314-1317)). (Year: 2011).*

International Search Report (with English translation) and Written Opinion issued in PCT/CN2020/099322, dated Mar. 26, 2021, 10 pages provided.

(Continued)

*Primary Examiner* — Lisa S Park
(74) *Attorney, Agent, or Firm* — HSML P.C.

(57) ABSTRACT

The present invention provides a crosslinker of formula (I) for electrolytes, and a electrolyte composition and a lithium-ion battery including the same, wherein M, R and X are as defined in the description. With the crosslinker of formula (I), not only the mechanical strength, heat resistance, ionic conductivity and electrochemical stability of the prepared electrolyte composition are improved, but also the long-term charge-discharge cycling stability of the lithium-ion battery is improved. The crosslinker has high industrial value.

22 Claims, 15 Drawing Sheets

(51) Int. Cl.
*H01M 4/58* (2010.01)
*H01M 10/0525* (2010.01)
*H01M 4/02* (2006.01)

(52) U.S. Cl.
CPC .. *H01M 10/0525* (2013.01); *H01M 2004/027* (2013.01); *H01M 2004/028* (2013.01); *H01M 2300/0082* (2013.01); *H01M 2300/0085* (2013.01)

(58) Field of Classification Search
CPC ............... H01M 2004/028; H01M 2300/0082; H01M 2300/0085; H01M 10/052; H01M 10/0567; H01M 10/0568; Y02E 60/10
See application file for complete search history.

(56) References Cited

FOREIGN PATENT DOCUMENTS

| | | | |
|---|---|---|---|
| CN | 106632164 A | | 5/2017 |
| CN | 108031496 A | | 5/2018 |
| CN | 108558598 | * | 9/2018 |
| JP | S62116564 | * | 5/1987 |

OTHER PUBLICATIONS

Li et al., "Radiation Synthesis and Properties of Imidazolium Hexafluorophosphate Poly(ionic liquid) Gel Electrolytes", Acta Polymerica Sinica, Mar. 2018, No. 3, pp. 349-355, with English Abstract, Cited in ISR.

* cited by examiner

CROSSLINKER FOR ELECTROLYTE, ELECTROLYTE COMPOSITIONS AND LITHIUM-ION BATTERY INCLUDING THE SAME

TECHNICAL FIELD OF THE INVENTION

The present disclosure relates to an additive and an electrolyte in the field of electrochemistry, and particularly to a crosslinker used in a solid electrolyte of a secondary battery, including an electrolyte composition and a lithium-ion battery including the same.

DESCRIPTION OF RELATED ART

With advancements in the field of consumer electronics, the applications of secondary batteries are more common, among which lithium-ion batteries are the commonest. Because lithium-ion batteries have advantages of high energy density, long service life, high operating voltage, stable current, and no memory effect, they are widely applied in fields of portable electronics, military, electric vehicles, aerospace, etc.

Currently, electrolytes of commercial lithium-ion batteries still use volatile and flammable solvents. Although these liquid electrolytes have high ionic conductivity at room temperature, they have a risk of solvent leakage after long-term use. Once the lithium-ion battery develops an abnormality, the liquid electrolyte is prone to overheating, easily creating dangers such as spontaneous combustion or even explosion, which should not be taken lightly.

Although alternative techniques using solid polymer electrolytes can be applied to solve the aforementioned safety issues, the mechanical strength of solid polymer electrolyte substituents is insufficient. Solid polymer electrolyte substituents are prone to be punctured by the unevenly stacked lithium metal on the electrode surface and lead to micro short circuits. Furthermore, the low mobility of the polymer chains of the electrolyte polymers also restricts their ionic conductivity.

On the other hand, although techniques introducing a crosslinker (commonly such as polyethylene glycol diacrylate) into an electrolyte for improving its mechanical strength exists, however, at high current density, it is prone to a problem of lithium dendrite formation caused by uncontrollable lithium ion reduction due to charge imbalance around the lithium metal electrode, affecting battery performance.

In consideration of the above, it is necessary to put forward an electrolyte that is both safe and with good performance, to meet the actual need of current applications.

SUMMARY OF THE INVENTION

To solve the aforementioned existing problems in the prior art, the present disclosure provides a crosslinker of formula (I) for electrolytes:

(I)

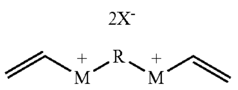

wherein M is selected from a monovalent imidazolium ion, a triazolium ion, a pyridinium ion, a substituted or unsubstituted phosphonium ion, or a substituted or unsubstituted ammonium ion;

R is $C_{1-12}$ linear alkylene, ethyleneoxy or polyethoxy, phenylene or polyphenylene; and X is a monovalent halogen-containing anion, a carboxylate-containing anion or a thiocyanate ion.

In an embodiment of the present disclosure, M is one selected from the group consisting of the following:

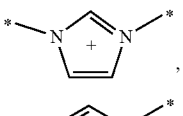, 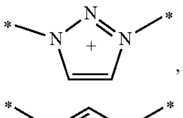,

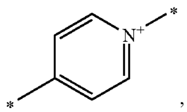, 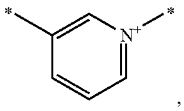,

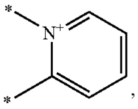, 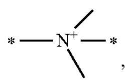, and 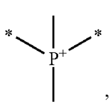, wherein * represents the junction whereto M couples to formula (I).

In another embodiment of the present disclosure, M is a monovalent imidazolium ion, and X is a monovalent halogen-containing anion; wherein the halogen-containing anion is selected from a chloride ion, a bromide ion, a tetrafluoroborate ion ($BF_4^-$), a hexafluorophosphate ion ($PF_6^-$), a bis(trifluoromethylsulfonyl)imide anion ($TFSI^-$), and a trifluoromethanesulfonate ion ($CF_3SO_3^-$).

In other embodiment of the present disclosure, R is liner butylene, liner octylene, or liner dodecylene.

In an embodiment of the present disclosure, the crosslinker of formula (I) is shown in compounds (I-1) to (1-3) of the following formula below:

(I-1)

, (I-2)

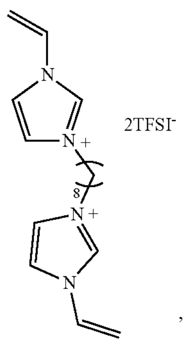,

-continued (I-3)

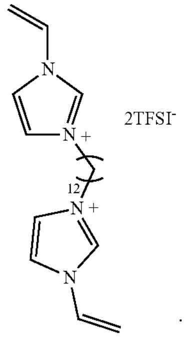

The present disclosure further provides an electrolyte composition comprising a polymer crosslinked by the aforementioned crosslinker, wherein the polymer is obtained from a reaction between a reactive monomer having an alkenyl or a sulfhydryl group and an initiator, and based on the total weight of the electrolyte composition, a moiety of the crosslinker of formula (I) contained in the crosslinked polymer is in an amount of 1 to 25 wt %.

In an embodiment of the present disclosure, the electrolyte composition further comprises an additive and an electrolyzable lithium salt.

In an embodiment of the present disclosure, a crosslinking density of the electrolyte composition is 5 to 25%.

In an embodiment of the present disclosure, a thermal degradation temperature of the electrolyte composition is 100 to 282° C.

In an embodiment of the present disclosure, a stress of the electrolyte composition at −40% strain is 0.029 to 0.064 MPa.

In an embodiment of the present disclosure, an electrical conductivity of the electrolyte composition is $1.17\times10^{-4}$ to $1.52\times10^{-4}$ S/cm under room temperature.

The present disclosure further provides a method of preparing an electrolyte composition, comprising: providing a reactive oligomer having an alkenyl or a sulfhydryl group; and in a presence of an additive and an electrolyzable lithium salt, carrying out a free radical polymerization by the reactive oligomer, the crosslinker of the present disclosure, and an initiator, to prepare the electrolyte composition.

In an embodiment of the present disclosure, a weight ratio of the crosslinker to the reactive oligomer is 5:95 to 25:75.

In an embodiment of the present disclosure, the initiator is a thermal initiator and is one selected from the group consisting of azobisisobutyronitrile (AIBN) and 2,2'-azobis (2-methylpropionamidine) dihydrochloride (AIBA), wherein a temperature of the free radical polymerization is 55 to 80° C. and a reaction time of the free radical polymerization is 6 to 24 hours.

In another embodiment of the present disclosure, the initiator is a photo initiator and is one selected from the group consisting of 2,2-dimethoxy-2-phenylacetophenone (DMPA), 2-hydroxy-2-methylpropiophenone, and 1-hydroxycyclohexyl phenyl ketone; wherein the wavelength range of a light source for the free radical polymerization is 350 to 400 nm and a reaction time of the free radical polymerization is 5 to 10 minutes.

In an embodiment of the present disclosure, the electrolyzable lithium salt is at least one selected from the group consisting of lithium bis(trifluoromethanesulphonyl)imide (LiTFSI), lithium hexafluorophosphate ($LiPF_6$), lithium bis (oxalate)borate (LiBOB), lithium tetrafluoroborate ($LiBF_4$), lithium difluoro(oxalato)borate (LiODFB), lithium bis(fluorosulfonyl)imide (LiFSI), lithium difluorophosphate ($LiPO_2F_2$), and lithium tetrafluorooxalatophosphate (LiFOP).

In an embodiment of the present disclosure, the additive is at least one selected from the group consisting of polyethylene glycol dimethyl ether (PEGDME), butanedinitrile (SN), and an ionic liquid, wherein the ionic liquid is 1-ethyl-3-methylimidazolium bis(trifluoromethylsulfonyl)imide (EMIM-TFSI) or 1-butyl-3-methylimidazolium bis(trifluoromethylsulfonyl)imide (BMIM-TFSI).

The present disclosure further provides a lithium-ion battery, comprising: a positive electrode; a negative electrode; and the electrolyte composition of the present disclosure.

In an embodiment of the present disclosure, the positive electrode is a lithium iron phosphate ($LiFePO_4$).

In another embodiment of the present disclosure, the negative electrode is lithium metal.

In an embodiment of the present disclosure, a charge-discharge capacity of the lithium-ion battery is greater than 160 mAh/g at 60° C., within a voltage range of 2.5 to 4.0 volts, and at a discharge rate of 1 to 2 C.

In another embodiment of the present disclosure, the charge-discharge capacity of the lithium-ion battery is greater than 158 mAh/g at 25° C., within the voltage range of 2.5 to 4.0 volts, and at the discharge rate of 0.2 to 0.3 C.

In an embodiment of the present disclosure, a capacity of the lithium-ion battery is 90% or more of an initial capacity after 100 charge-discharge cycles, under a condition of 60° C. and at a discharge rate of 0.2 to 0.5 C.

In another embodiment of the present disclosure, the capacity of the lithium-ion battery capacity is 90% or more of the initial capacity after 150 charge-discharge cycles, under the condition of 25° C. and at the discharge rate of 0.2 C.

By adding the crosslinker of formula (I), the ionic group of the crosslinker is evenly distributed throughout the structure of the prepared electrolyte composition of the present disclosure, which not only improves ionic conductivity of the electrolyte composition, but also acts as a localized reservoir of anions. In high current density environment, the ionic group is used to alleviate charge imbalance around the lithium metal electrode and delay a formation of lithium dendrite.

On the other hand, through the dense crosslinked structure provided by the crosslinker of formula (I), the mechanical strength and heat resistance of the prepared electrolyte composition is improved, the lithium metal electrode surface remains uniform, and the problem of micro short circuits caused by punctures is avoided. The electrochemical stability and long-term charge-discharge cycling stability of the lithium-ion battery are significantly improved, and its service life is also extended. Thus, the crosslinker of the present disclosure has high industrial applied value and market prospects.

BRIEF DESCRIPTION OF THE DRAWINGS

Embodiments of the present disclosure are illustrated by way of exemplary reference drawings.

DETAILED DESCRIPTION OF THE INVENTION

Figure 1:
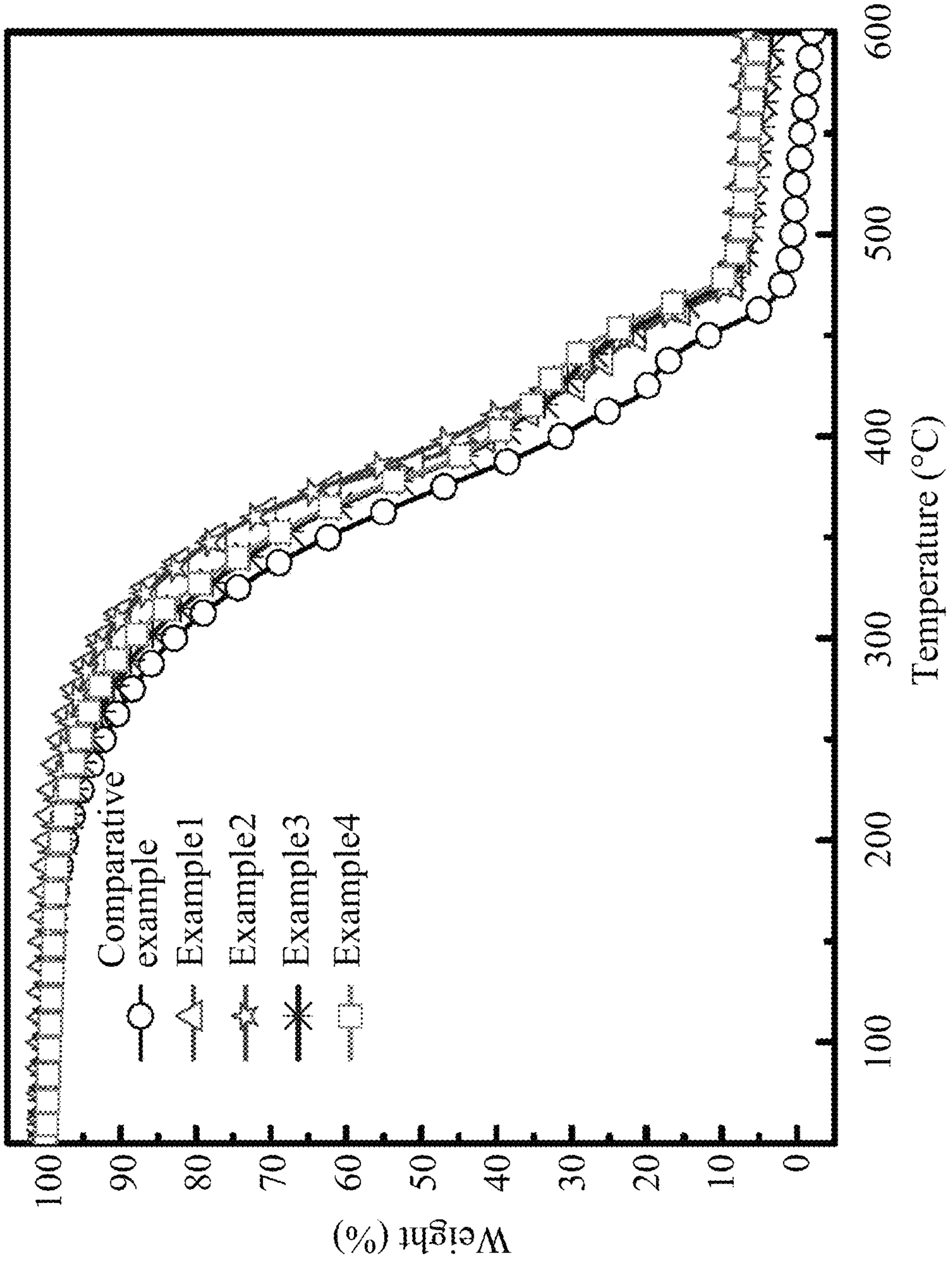
FIG. 1 is a TGA weight change curve graph of the electrolyte compositions of Comparative Example and Examples of the present disclosure.

The embodiments of the present disclosure are described by way of specific examples, and those skilled in the art can conceive and understand the advantages and functions of the present disclosure from the present disclosure. The present disclosure may be implemented or applied by other different embodiments, and the each of details in the present specification may be variously modified and changed without departing from the spirit and scope of the present disclosure. In addition, all of the ranges and values herein are inclusive and combinable. Any value or point fallen within the ranges recited herein, such as any numerical value or point, may be the minimum or maximum value to derive a subrange and the like.

According to the present disclosure, provided is a crosslinker of formula (I) for electrolytes:

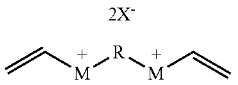

(I)

wherein M is selected from a monovalent imidazolium ion, a triazolium ion, a pyridinium ion, a substituted or unsubstituted phosphonium ion, or a substituted or unsubstituted ammonium ion;

R is $C_{1-12}$ linear alkylene, ethyleneoxy or polyethoxy, phenylene or polyphenylene; and X is a monovalent halogen-containing anion, a carboxylate-containing anion, or a thiocyanate ion.

The term "substituted" in "a substituted or unsubstituted" expressed herein indicates that one or more hydrogen atoms in a certain functional group is replaced by another atom or group (i.e. substituent), and the substituent can be selected from a $C_{1-20}$ linear or branched alkyl group.

The term "polyethoxy" described herein is a polymerized group with ethoxy as a repeating unit and a degree of polymerization ranging from 1 to 230.

The term "polyphenylene" described herein is a polymerized group with phenyl as a repeating unit and a degree of polymerization ranging from 1 to 3.

The term "halogen" described herein is fluorine, chlorine, bromine, or iodine.

The phrase "carboxylate-containing anion" described herein refers to, for example, but not limit to, acetate, propionate, butyrate, isobutyrate or any derivative of the group thereof.

In the structure of the crosslinker of the present disclosure, compared with those with alkene group at a single end, the prepared electrolyte has significant mechanical strength because both ends of the crosslinker have an alkene group.

In the structure of the crosslinker of the present disclosure, the cation group M not only acts to improve the ionic conductivity of the prepared electrolyte, but also acts as a localized reservoir of anions. The cation group M eases the charge imbalance around the lithium metal electrode and delays a formation of lithium dendrite under high current density environment, thereby improving the electrochemical stability of the prepared electrolyte. For example, the structure and bonding of M can be one selected from the groups consisting of the following:

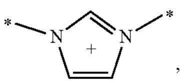
,
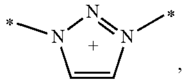
,
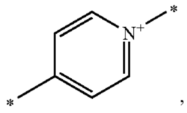
,
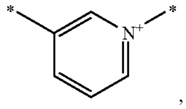
,
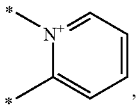
,
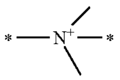
and
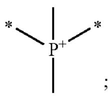
;

wherein * indicates the junction whereto M couples to formula (I). In an embodiment, M is preferably an imidazolium ion.

In the structure of the crosslinker of the present disclosure, the spacer group R is used to adjust the stiffness of the structure of the crosslinked polymer molecular. If R is selected from $C_{1-12}$ linear alkylene, phenylene, or polyphenylene, then a more rigid crosslinked polymer can be prepared; if R is an oxygen-containing segment such as ethyleneoxy or polyethoxy, then a softer crosslinked polymer can be obtained. In an embodiment, R is liner butylene, liner octylene, or liner dodecylene.

In the structure of the crosslinker of the present disclosure, the anion group X is used to adjust the hydrophilicity and hydrophobicity of the produced electrolyte. If X is selected from a chloride ion or a bromide ion, then a more hydrophilic electrolyte can be prepared; if X is bis(trifluoromethylsulfonyl)imide anion ($TFSI^-$), then a more hydrophobic electrolyte can be obtained.

In a preferred embodiment, M is a monovalent imidazolium ion and X is a monovalent halogen-containing anion.

The phrase "halogen-containing anion" described herein is selected from a chloride ion, a bromide ion, a tetrafluoroborate ion ($BF_4^-$), a hexafluorophosphate ion ($PF_6^-$), a bis(trifluoromethylsulfonyl)imide anion ($TFSI^-$), and a trifluoromethanesulfonate ion ($CF_3SO_3^-$).

In another preferred embodiment, the crosslinker of formula (I) of the present disclosure is compounds (I-1) to (I-3) as shown in the formula below:

(I-1)

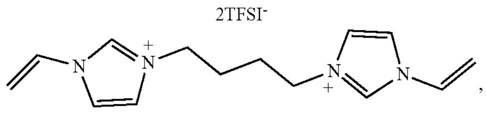, (I-2)

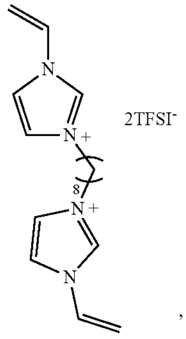, (I-3)

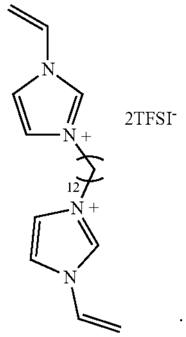.

Regarding a method of preparing the crosslinker of aforementioned compounds (I-1) to (I-3), it comprises: in the presence of a solvent, N-vinylimidazole and an alkyl dihalide are prereacted to produce a prereactant; and the prereactant and a salt containing halogen, carboxylate, or thiocyanate undergo a displacement reaction to form the crosslinker of the aforementioned formula.

In an embodiment, the preparation method of the crosslinker of aforementioned formula (I-1) is: by using ethyl acetate as a solvent, N-vinylimidazole and 1,4-dihalidebutane are prereacted at a temperature of 60° C. to 80° C.; and then by using water as a solvent, the prereactant and lithium bis(trifluoromethanesulphonyl)imide (LiTFSI) undergo a displacement reaction to produce the crosslinker of aforementioned compound (I-1).

Moreover, the present disclosure further provides an electrolyte composition for use in a battery system and as an ion transport medium, wherein the electrolyte composition comprises a polymer crosslinked by the aforementioned crosslinker, wherein the polymer is prepared from a reaction between a reactive monomer having an alkenyl or a sulfhydryl and an initiator, wherein based on a total weight of the electrolyte composition, a moiety of the crosslinker of formula (I) contained in the crosslinked polymer is in an amount of 1 to 25 wt %.

In an embodiment, the electrolyte composition of the present disclosure further comprises an additive and an electrolyzable lithium salt. In an embodiment, a weight ratio of the crosslinked polymer, the additive, and the electrolyzable lithium salt is 5:4:3, and the initiator is 1 wt % of the total weight of the crosslinked polymer.

The term "polymer" described herein refers to one formed from a polymerization of one reactive oligomer selected form the group consisting of poly(ethylene glycol) methyl ether methacrylate (PEGMEMA) and poly(ethylene glycol) diacrylate (PEGDA), the initiator, and the aforementioned crosslinker. In an embodiment, based on the total weight of the electrolyte composition, the content of the polymer is 20 to 60 wt %.

The term "additive" described herein not only gives the electrolyte itself enough ionic conductivity, but also improves and lowers the interfacial impedance of the electrolyte/electrode so as to improve overall battery stability. Different additive can be selected depending on different needs of practical applications, for example: polyethylene glycol dimethyl ether (PEGDME), butanedinitrile (SN), or an ionic liquid; wherein the ionic liquid is 1-ethyl-3-methylimidazolium bis(trifluoromethylsulfonyl)imide (EMIM-TFSI) or 1-butyl-3-methylimidazolium bis(trifluoromethylsulfonyl)imide (BMIM-TFSI).

Under the condition of the same composition ratio, the electrolyte with butanedinitrile has good ionic conductivity; the electrolyte with an ionic liquid has good thermal stability and chemical stability; the electrolyte with PEGDME has the characteristic of both having good thermal stability, high ionic conductivity, and the acceptable range of various properties.

In an embodiment, the additive can be used alone, or in combination of two or more. When used in combination, the composition and ratio are adjusted according to their effect.

In an embodiment, based on the total weight of the electrolyte composition, the total content of the additive is 20 to 50 wt %. In a preferred embodiment, based on the total weight of the electrolyte composition, the total content of the additive is 33 wt %.

The phrase "electrolyzable lithium salt" described herein can be one selected from the group consisting of lithium bis(trifluoromethanesulphonyl)imide (LiTFSI), lithium hexafluorophosphate ($LiPF_6$), lithium bis(oxalate)borate (LiBOB), lithium tetrafluoroborate ($LiBF_4$), lithium difluoro (oxalato)borate (LiODFB), lithium bis(fluorosulfonyl)imide (LiFSI), lithium difluorophosphate ($LiPO_2F_2$), and lithium tetrafluorooxalatophosphate (LiFOP). In an embodiment, based on the total weight of the electrolyte composition, the total content of the electrolyzable lithium salt is 10 to 40 wt %. In a preferred embodiment, based on the total weight of the electrolyte composition, the total content of the electrolyzable lithium salt is 25 wt %.

In a preferred embodiment, the reactive oligomer is a poly(ethylene glycol) methyl ether methacrylate, the additive is a polyethylene glycol dimethyl ether, and the electrolyzable lithium salt is lithium bis(trifluoromethanesulphonyl)imide.

Next, the preparation method of the electrolyte composition of the present disclosure is further described, which comprises: providing a reactive oligomer having an alkenyl or a sulfhydryl; and in the presence of the additive and the electrolyzable lithium salt, carrying out a free radical polymerization by the reactive oligomer, the initiator and the crosslinker of formula (I), to prepare the electrolyte composition.

Because the aforementioned "reactive oligomer" has an alkenyl or a sulfhydryl functional group, it can undergo polymerization with the crosslinker of formula (I) of the present disclosure in the presence of an initiator.

When preparing the electrolyte composition, the molecular weight of the reactive oligomer molecular weight is selected in consideration of the mutual solubility between the reactive oligomer and the crosslinker, and the one with better mutual solubility is an applicable criterion. For example, when a poly(ethylene glycol) methyl ether methacrylate (PEGMEMA) is used as the reactive oligomer, the molecular weight of less than 1000 g/mol is selected to avoid the crystallization of segments due to excessive molecular weight, which will affect its ionic conductivity. In an embodiment, the molecular weight of the poly(ethylene glycol) methyl ether methacrylate (PEGMEMA) is 500 g/mol.

In an embodiment of the present disclosure, the weight ratio of the crosslinker to the reactive oligomer is 5:95 to 25:75, in other word, the crosslinking density of the prepared electrolyte composition electrolyte is 5 to 25%, wherein the crosslinking density is preferably 20%.

The aforementioned "initiator" can be a thermal initiator or a photo initiator, wherein the thermal initiator can be one selected from the group consisting of azobisisobutyronitrile (AIBN) and 2,2'-azobis(2-methylpropionamidine) dihydrochloride (AIBA); and, the photo initiator can be one selected from the group consisting of 2,2-dimethoxy-2-phenylacetophenone (DMPA), 2-hydroxy-2-methylpropiophenone, and 1-hydroxycyclohexyl phenyl ketone.

When the free radical polymerization is initiated by the thermal initiator, the free radical polymerization temperature is 55 to 80° C. and the reaction time of the free radical polymerization is 6 to 24 hours. In an embodiment, the thermal initiator is an azobisisobutyronitrile (AIBN), the free radical polymerization temperature is 55° C., and the reaction time of the free radical polymerization is 6 hours.

When the free radical polymerization is initiated by the photo initiator, the wavelength range of a light source for the free radical polymerization is 350 to 400 nm and the reaction time of the free radical polymerization is 5 to 10 minutes. In an embodiment, the photo initiator is 2,2-dimethoxy-2-phenylacetophenone (DMPA), the wavelength range of a light source for the free radical polymerization is 350 nm, and the reaction time of the free radical polymerization is 5 minutes.

The electrolyte composition of the present disclosure forms a dense crosslinked structure through the crosslinker of formula (I), so its onset temperature of thermal degradation is 100 to 282° C., clearly showing excellent thermal stability in high temperature environment. Moreover, the thermal degradation temperature varies according to different additives. For example: when butanedinitrile (SN) is used as the additive, the onset temperature of thermal degradation is approximately 100° C.; when poly(ethylene glycol) based additive is used, the onset temperature of thermal degradation is approximately 200° C., and especially, when polyethylene glycol dimethyl ether (PEGDME) is used, the onset temperature of thermal degradation is between 255 to 282° C.; and when an ionic liquid is used as the additive, the onset temperature of thermal degradation is above 300° C.

Furthermore, the dense crosslinked structure also give the electrolyte composition good mechanical strength. In other word, the dense crosslinked structure enables the stress of the electrolyte composition at −40% stain is 0.029 to 0.064 MPa, to keep the lithium metal electrode surface uniform, avoid the problem of micro short circuits caused by punctures, and significantly improve the electrochemical stability of the lithium-ion battery.

On the other hand, a plurality of ionic groups are introduced through the crosslinker of the present disclosure and the ionic groups are evenly distributed throughout the structure of the prepared electrolyte composition, so that the electrolyte composition can exhibit ionic conductivity ranging from $1.17\times10^{-4}$ to $1.52\times10^{-4}$ S/cm under the condition of high crosslink density, clearly showing the effect of the crosslinker to give high ionic conductivity.

In addition, the present disclosure further provides a lithium-ion battery, comprising: a positive electrode; a negative electrode; and the aforementioned electrolyte composition.

The term "anode" described herein can, but not limited to, be one selected from the group consisting of lithium iron phosphate, lithium cobalt(III) oxide ($LiCoO_2$), lithium nickel oxide ($LiNiO_2$), lithium-manganese dioxide ($LiMnO_2$), lithium manganese oxide ($Li_xMn_2O_4$, $0\leq X\leq3$), and lithium nickel cobalt manganese oxide (NCM).

The term "cathode" described herein can, but not limited to, be one selected from the group consisting of lithium metal, graphite type carbon material, and silicon based material.

In terms of the application of the lithium-ion battery system, by adding crosslinker of formula (I) to the electrolyte composition, it can be seen that the lithium-ion battery has the charge-discharge capacity of greater than 160 mAh/g at 60° C., within the voltage range of 2.5 to 4.0 volts, and at the discharge rate of 1 to 2 C. the effect of the crosslinker in giving high charge-discharge capacity is evident.

In an embodiment, the lithium-ion battery has the charge-discharge capacity of 158 mAh/g at 25° C., within the voltage range of 2.5 to 4.0 volts, and at the discharge rate of 0.3 C.

In another embodiment, the lithium-ion battery has the charge-discharge capacity of 165 mAh/g at 60° C., within the voltage range of 2.5 to 4.0 volts, and at the discharge rate of 1 C.

In terms of capacity, under the condition of the electrolyte composition having such crosslinked structure and under the condition of 60° C. and the discharge rate of 0.2 to 0.5 C, the lithium-ion battery capacity is 90% or more of the initial capacity. It is clear that even at high operating temperature, the electrolyte composition of the present disclosure is capable of inhibiting the formation of lithium dendrite, stably performing high charge-discharge rate electrical cycles for an extended duration. The electrolyte composition of the present disclosure has good electrochemistry stability and durability.

In an embodiment, the lithium-ion battery has a capacity of 94% of the initial capacity after 150 charge-discharge cycles, under the condition of 25° C. and the discharge rate of 0.2 C.

In another embodiment, the lithium-ion battery has a capacity of 92% of the initial capacity after 180 charge-discharge cycles, under the condition of 60° C. and the discharge rate of 0.2 C.

In yet another embodiment, the lithium-ion battery has a capacity of 95% of the initial capacity after 100 charge-discharge cycles, under the condition of 60° C. and the discharge rate of 0.5 C.

The present disclosure is further illustrated in detail through Examples, but the scope of the present disclosure is by no means limited thereto.

Preparative Example 1: Preparation of a Crosslinker (I-1)

N-vinylimidazole (10 g, 2.2 Eq), 1,4-diiodobutane (15 g, 1 Eq) and ethyl acetate (75 mL) were placed in a reaction kettle to carry out a prereaction at 77° C. and normal pressure under reflux. After the reaction was completed, extraction was carried out with ethyl acetate and water. The aqueous part of the extraction liquid was collected and a prereaction product was included therein.

Next, an aqueous solution containing lithium bis(trifluoromethanesulphonyl)imide (33.5 g, 1.1 Eq) was added dropwise to the extract of the aqueous part containing the prereaction product therein. They were placed in a reaction kettle and a replacement reaction was carried out for 3 hours with stirring at room temperature and normal pressure. After the reaction was completed, a white solid powder was obtained.

The aforementioned white solid powder was subjected to the following purification process: after dissolving the white solid powder in ethyl acetate (150 mL), saline was used to wash away residual sodium iodide. Then, water and impurities were removed by adding activated carbon and anhydrous sodium sulfate and stirring for 30 minutes. After filtration and vacuum drying, a crosslinker of compound (I-1) white powder was obtained.

(I-1)

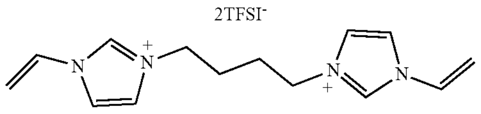

Preparative Example 2: Preparation of a Crosslinker (I-2)

The preparation method was the same as that of Preparative Example 1, except that 1,4-diiodobutane was replaced by 1,8-diiodooctane (17.7 g, 1 Eq). After reaction and purification, a crosslinker of compound (I-2) was obtained.

(I-2)

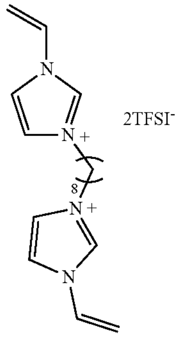

Preparative Example 3: Preparation of a Crosslinker (I-3)

The preparation method was the same as that of Preparative Example 1, except that the 1,4-diiodobutane was replaced by 1,12-dibromododecane (15.9 g, 1 Eq). After reaction and purification, a crosslinker of compound (I-3) was obtained.

Comparative Example: Preparation of an Electrolyte Composition

Use 2 g of poly(ethylene glycol) methyl ether methacrylate (molecular weight: 500 g/mol) as the reactive oligomer, 0.02 g of azobisisobutyronitrile (AIBN) as the initiator, 1.6 g of polyethylene glycol dimethyl ether (PEGDME) as the additive, and 1.2 g of lithium bis(trifluoromethanesulphonyl)imide (LiTFSI) as the lithium salt. The aforementioned ingredients were mixed to form a clear transparent solution. At the temperature of 55° C. and normal pressure, a set quantity of the precursor solution was applied to a lithium metal surface using a dropper for 6 hours of free radical polymerization to form a 200 to 300 nm thick electrolyte film. After the reaction was completed, an electrolyte composition was obtained.

Example 1: Preparation of an Electrolyte Composition

Use 1.8 g of poly(ethylene glycol) methyl ether methacrylate (molecular weight 500 g/mol) as the reactive oligomer, 0.02 g of azobisisobutyronitrile (AIBN) as the initiator, 0.2 g of the crosslinker of the aforementioned Preparative Example 1, 1.6 g of polyethylene glycol dimethyl ether (PEGDME) as the additive, and 1.2 g of lithium bis(trifluoromethanesulphonyl)imide (LiTFSI) as the lithium salt. The aforementioned ingredients were mixed to form a clear transparent precursor solution. At the temperature of 55° C. and normal pressure, a set quantity of the precursor solution was applied to a lithium metal surface using a dropper for 6 hours of free radical polymerization to form a 200 to 300 nm thick electrolyte film, wherein the crosslinked polymer, the additive, and the lithium salt were set to a weight ratio of 5:4:3, and the initiator was set to be 1 wt % of the polymer total weight. After the reaction was completed, an electrolyte composition was obtained.

Example 2 to 6: Preparation of an Electrolyte Composition

The preparation method was the same as that of Example 1, except that the quantity and type of the reactive oligomer and the aforementioned crosslinker of Preparative Examples were modified according to Table 1. After the free radical polymerization, an electrolyte composition was obtained.

TABLE 1

| | Quantity (g) | | | | | |
|---|---|---|---|---|---|---|
| | Crosslinker | | Reactive oligomer (PEGMEMA) | Lithium salt (LiTFSI) | Additive (PEGDME) | Initiator (AIBN) |
| Comparative Example | 0 | | 2 | 1.2 | 1.6 | 0.02 |
| Example 1 | (I-1) | 0.2 | 1.8 | | | |
| Example 2 | compound | 0.3 | 1.7 | | | |
| Example 3 | | 0.4 | 1.6 | | | |
| Example 4 | | 0.5 | 1.5 | | | |
| Example 5 | (I-2) compound | 0.4 | 1.6 | | | |
| Example 6 | (I-3) compound | 0.4 | 1.6 | | | |

The aforementioned electrolyte composition products of Comparative Example and Examples were analyzed in accordance with the test methods below, and recorded in FIGS. 1 to 4B:

(1) Evaluation of Thermal Degradation Test

A thermogravimetric analyzer (TGA, Perkin Elmer, TGA 4000) was used for measurement. At normal pressure and under a nitrogen atmosphere, the changes in weight loss of the prepared electrolyte compositions against temperature were measured at a heating rate of 10° C./minute. The thermal degradation temperature is defined as the temperature at which 5% of its initial weight is lost.

(2) Evaluation of Dynamic Mechanical Test

The prepared electrolyte composition was processed into a cylindrical sample with a diameter of 10 mm and a height of 5 mm. Use a dynamic mechanical analyzer (DMA, TA Instruments, ARES G2) for measurement at 0.01 mm/s compression rate and within a range that strain is 0 to −40% to obtain a stress-strain curve graph.

(3) Evaluation of Ionic Conductivity Test

An electrochemical impedance analyzer (CH Instruments, 6116E) with two pole stainless steel electrodes was used for measurement, with the amplitude set to 10 M and within a scan frequency range of 10 to 100000 Hz. The lowest point of impedance spectrum is the resistance value ($R_b$) of the prepared electrolyte composition and its ionic conductivity (electric conductivity, a) can be calculated by the following formula:

$$\sigma = \frac{L}{R_b \times A}$$

wherein L is the thickness (cm) of the electrolyte composition thin film, A is the area ($cm^2$) of stainless steel electrode.

Figure 3:
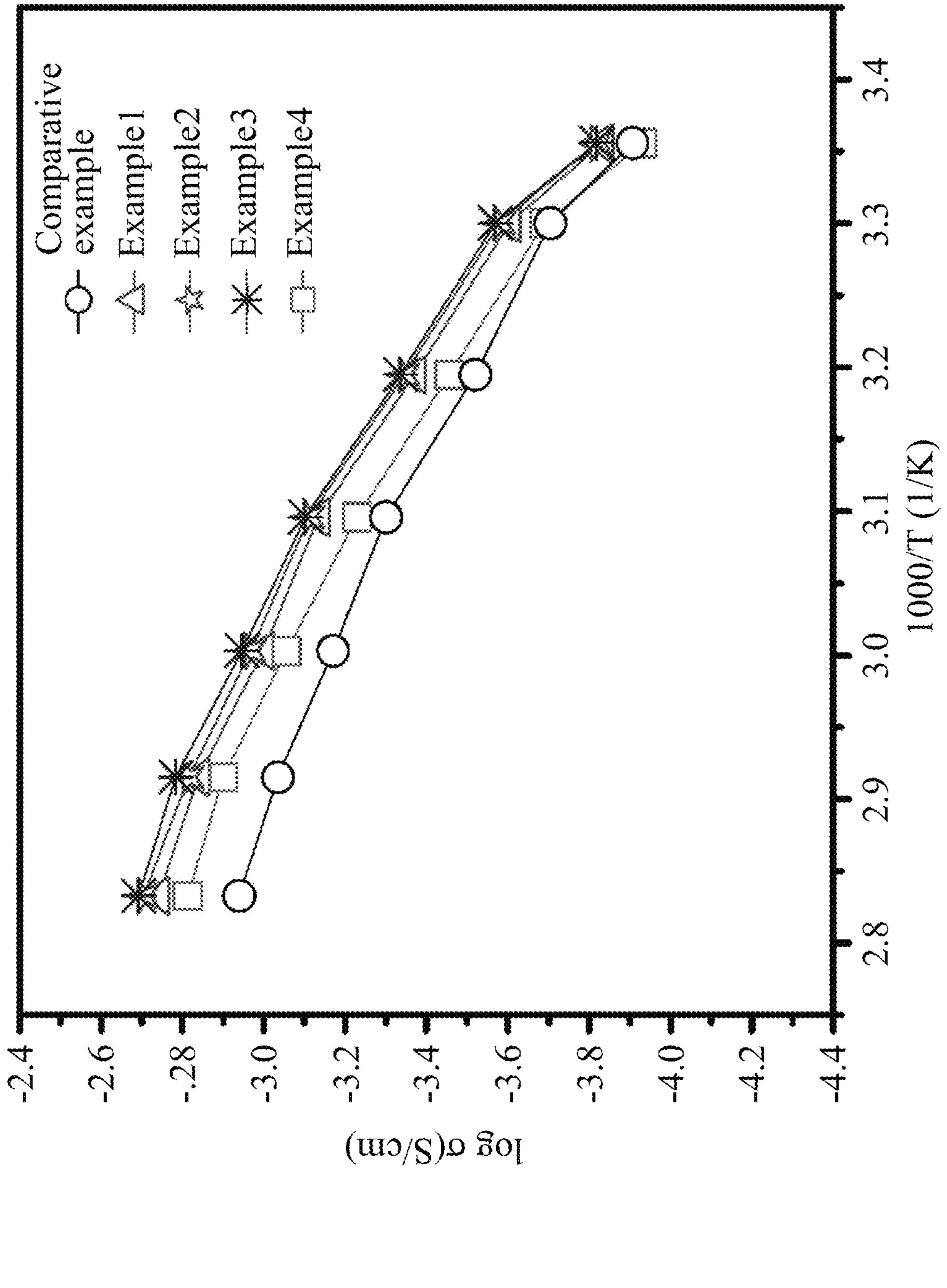
FIG. 3 is a graph of the variation of ionic conductivity (o) vs. temperature (T) of the electrolyte compositions of Comparative Example and Examples of the present disclosure.

FIG. 3 is a graph of the variation of ionic conductivity (a) with temperature (T), recording the ionic conductivity at each temperature in the range of 25 to 80° C.

(4) Linear Sweep Voltammetry Test

An electrochemical impedance analyzer (CH Instruments, 6116E) with a stainless steel working electrode, a lithium metal auxiliary electrode, and a lithium metal reference electrode was used. The electrochemical stability of the prepared electrolyte compositions was tested by cycling at a potential scan rate of 5 mV/S and a voltage scan range of 0 to 6 volts by two pole stainless steel electrodes.

As shown in the result of TGA weight change curve in FIG. 1, compared with Comparative Example that does not contain the crosslinker, the thermal degradation temperature of the electrolyte compositions of Examples 1 to 4 increased with the addition of the crosslinker, wherein the degradation temperature was from 255° C. to 282° C., higher than 227° C. in Comparative Example. It is clear that the thermal stability of the electrolyte composition is greatly improved by the introduction of the crosslinker.

Figure 2A:
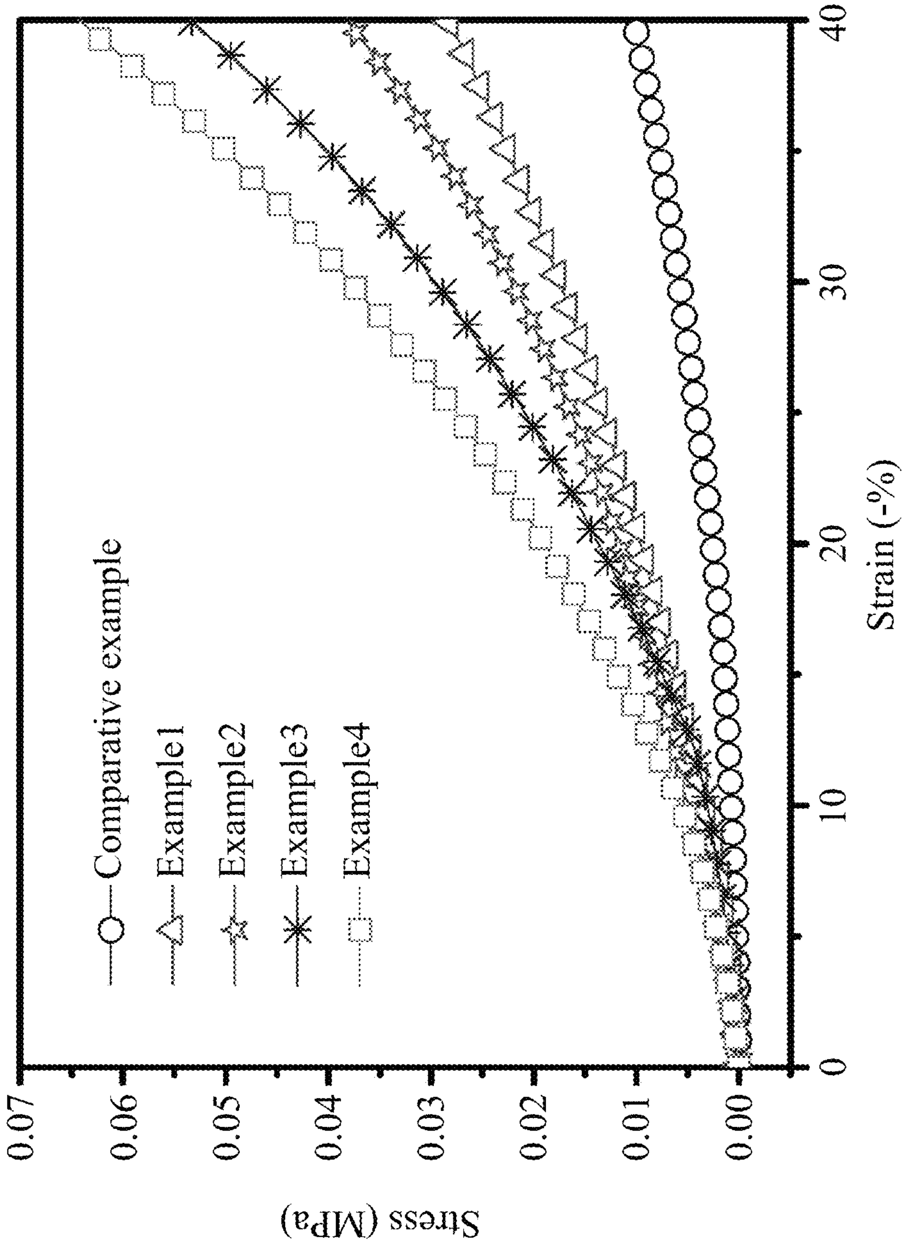
FIGS. 2A and 2B are DMA compression tests stress-strain curve graphs of the electrolyte compositions of Comparative Example and Examples of the present disclosure.
Figure 2B:
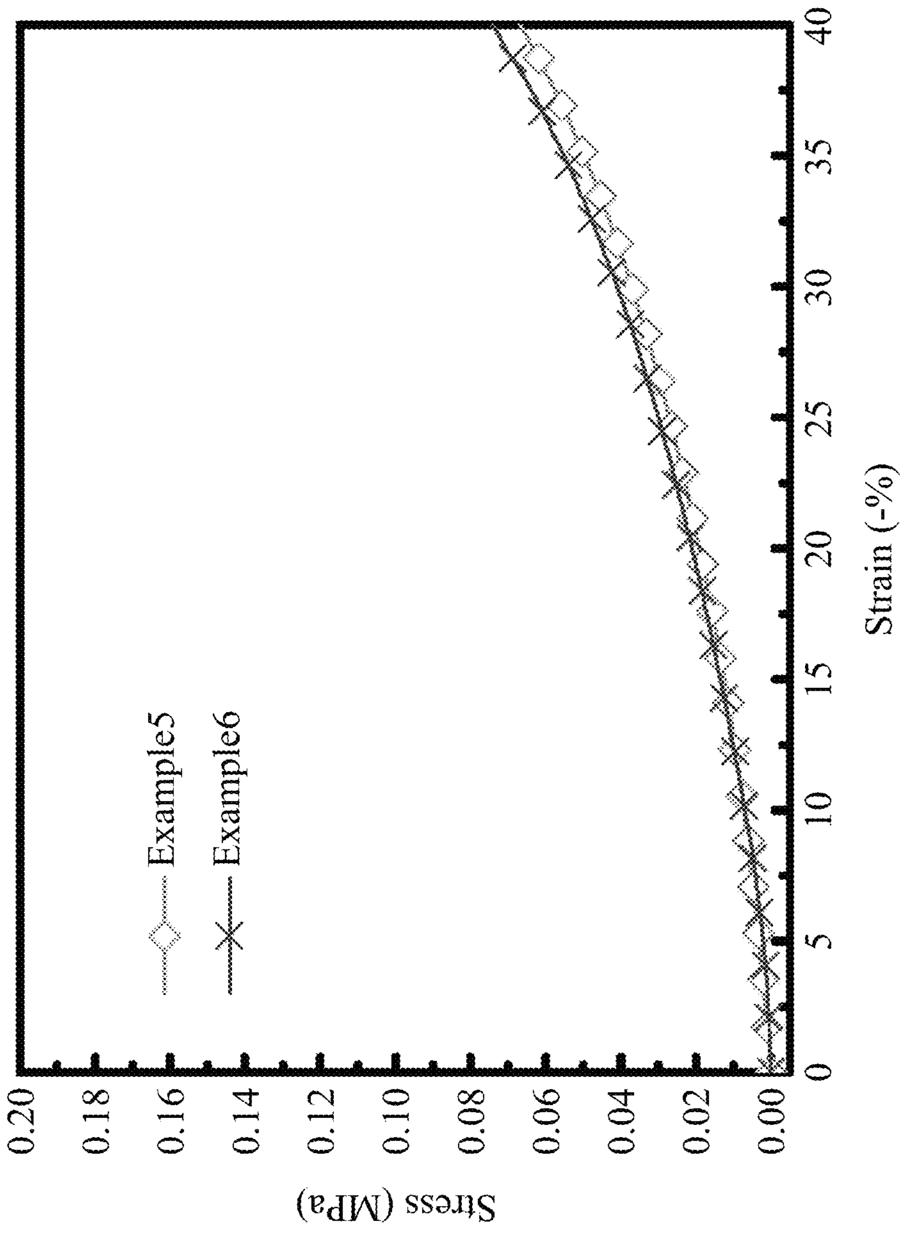

As shown in the result of DMA compression test stress-strain curve in FIGS. 2A and 2B, compared with Comparative Example that does not contain the crosslinker, the molecular weight of the electrolyte compositions of Examples 1 to 6 of the present disclosure greatly increased due to the introduction of the crosslinker and the cross-linked points created in the polymer structure, and thereby their mechanical strength also significantly increased. Especially for Examples 5 and 6, because of their longer carbon chain of the R group of the crosslinker, their mechanical strength was also significantly improved.

Moreover, as shown in the result of ionic conductivity changes in FIG. 3, compared with Comparative Example that does not contain the crosslinker, the ionic conductivity of the electrolyte compositions of Examples 1 to 3 of the present disclosure increased slightly and increased with the addition of the crosslinker. For comparison, the ionic conductivity of the electrolyte of the prior art and the electrolyte composition of Example 4 was restricted because their crosslinking density was too high resulting in a too dense molecular structure; in contrast, the electrolyte composition of Example 3 of the present disclosure presented a very high charge density and ideal crosslinking density, and therefore showed the best ionic conductivity.

Figure 4A:
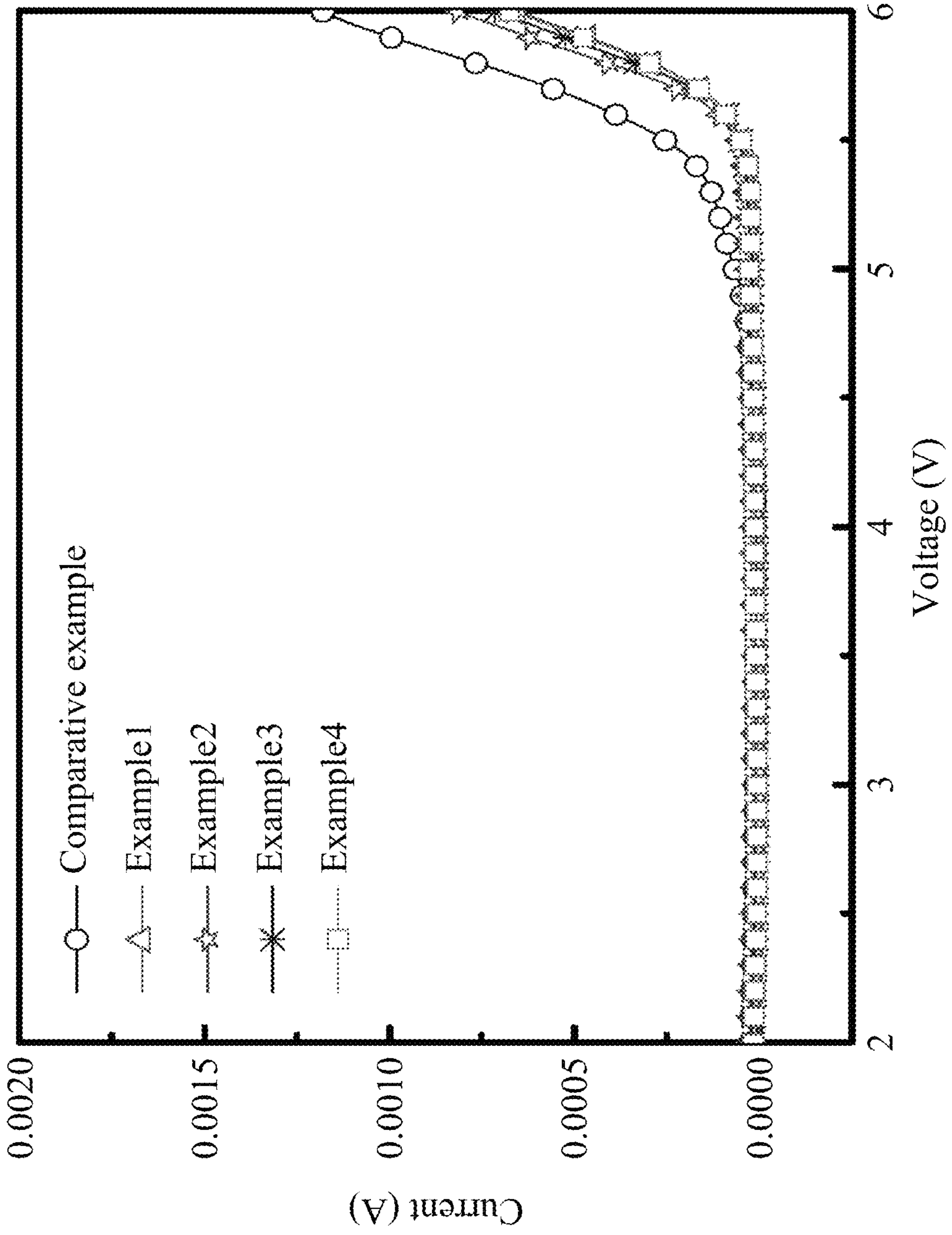
FIGS. 4A and 4B are linear sweep voltammograms of the electrolyte compositions of Comparative Example and Examples of the present disclosure.
Figure 4B:
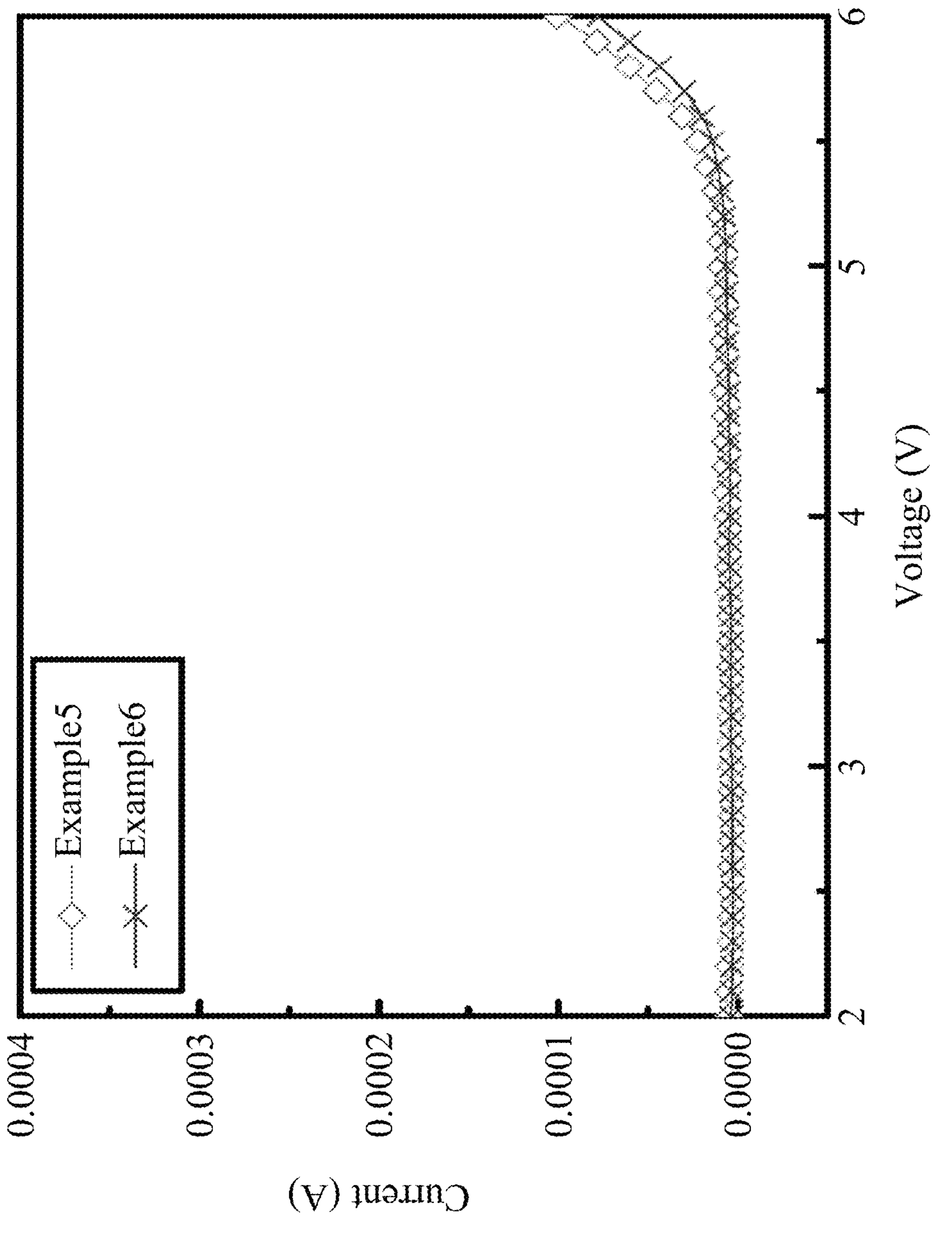

Furthermore, as shown in the result of linear sweep voltammograms in FIGS. 4A and 4B, compared with Comparative Example that does not contain the crosslinker, the oxidation onset potential of the electrolyte compositions of Examples 1 to 6 of the present disclosure increased, wherein the oxidation onset potential was from 4.7 V to 5.3 V. It is clearly shown that the electrochemical stability of the electrolyte composition is greatly improved by the introduction of the crosslinker.

Test Example: Preparation of a Lithium-Ion Battery

Preparation of a positive electrode material: Firstly, lithium iron phosphate ($LiFePO_4$), sulfate/carbon black (Super P), and poly(vinylidene fluoride) (PVDF) was weighed (weight ratio is 80:10:10). 0.1 g of PVDF and 2.5 g of N-methylpyrrolidone (NMP) solvent were placed into a vacuum mixer and stirred for 15 minutes, then 0.1 g of Super P was added and stirred for 15 minutes, and lastly the remaining 0.8 g of $LiFePO_4$ was added and stirred for 30 minutes continuously (total stirring time is 60 minutes). A paste is produced.

Through an automatic coating machine with a 150 micron thick blade, the paste was evenly coated on an aluminum foil at a coating rate of 300 mm/second, to produce an electrode. The electrode was placed into 100° C. vacuum oven for 24 hours to remove NMP solvent. After the drying was completed, the electrode was placed into a roller press machine for compaction (the compaction thickness was set to 0.04 mm) to make the electrode thickness uniform and more compact. Finally, the electrode was cut into a circular shape using a cutter with a diameter of 13 mm, i.e., a circular positive electrode.

Figure 7:
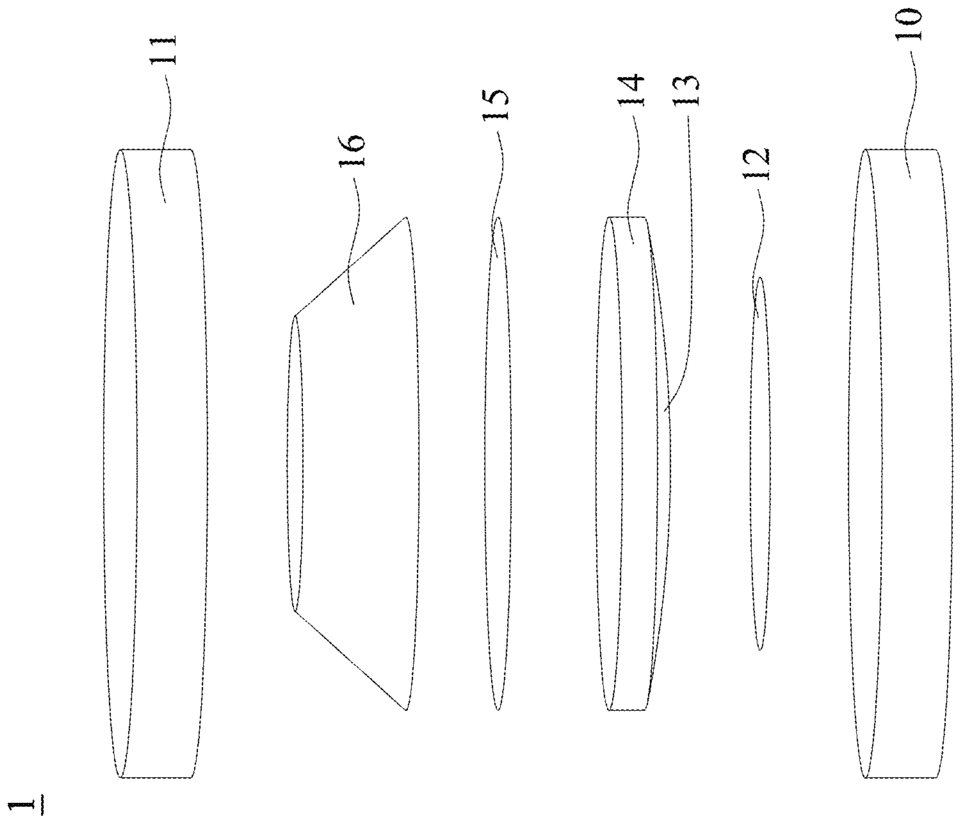
FIG. 7 is a schematic diagram illustrating the lithium-ion battery structure of the present disclosure.

Assembly of the lithium-ion battery: Assemble according to the lithium-ion battery 1 structure depicted in FIG. 7. The aforementioned prepared circular positive electrode 12 was placed in the center of a bottom case 10. Then, lithium metal (UBIQ) was used as a negative electrode 14, then the aforementioned electrolyte composition prepared in Example 3 was applied to the surface of the negative electrode to form a electrolyte thin film 13 with thick of proximately 200 to 300 microns, and the electrolyte thin film 13 was between the circular positive electrode 12 and the negative electrode 14. A stainless steel spacer 15, a spring washer 16, and a top case 11 were sequentially set above the negative electrode 14. The assembly was pressed three times through a sealer at 1000 psi and a button cell lithium-ion battery was obtained.

The charge-discharge capacity and long-term charge-discharge cycling stability of the aforementioned assembled lithium-ion battery product were analyzed in accordance with the following methods:

A battery automation test system (ACUTECH SYSTEMS, BAT-750B) was used for the measurement of battery capacity and charge-discharge current of the lithium-ion battery. The charge-discharge curves within a voltage ranging from 2.5 to 4.0 V were obtained at 25° C. and a charge-discharge rate of 0.1 C, 0.2 C, 0.3 C, 0.5 C, and 1 C, based on the mass of the positive electrode material, and were recorded in FIG. 5A.

Figure 5A:
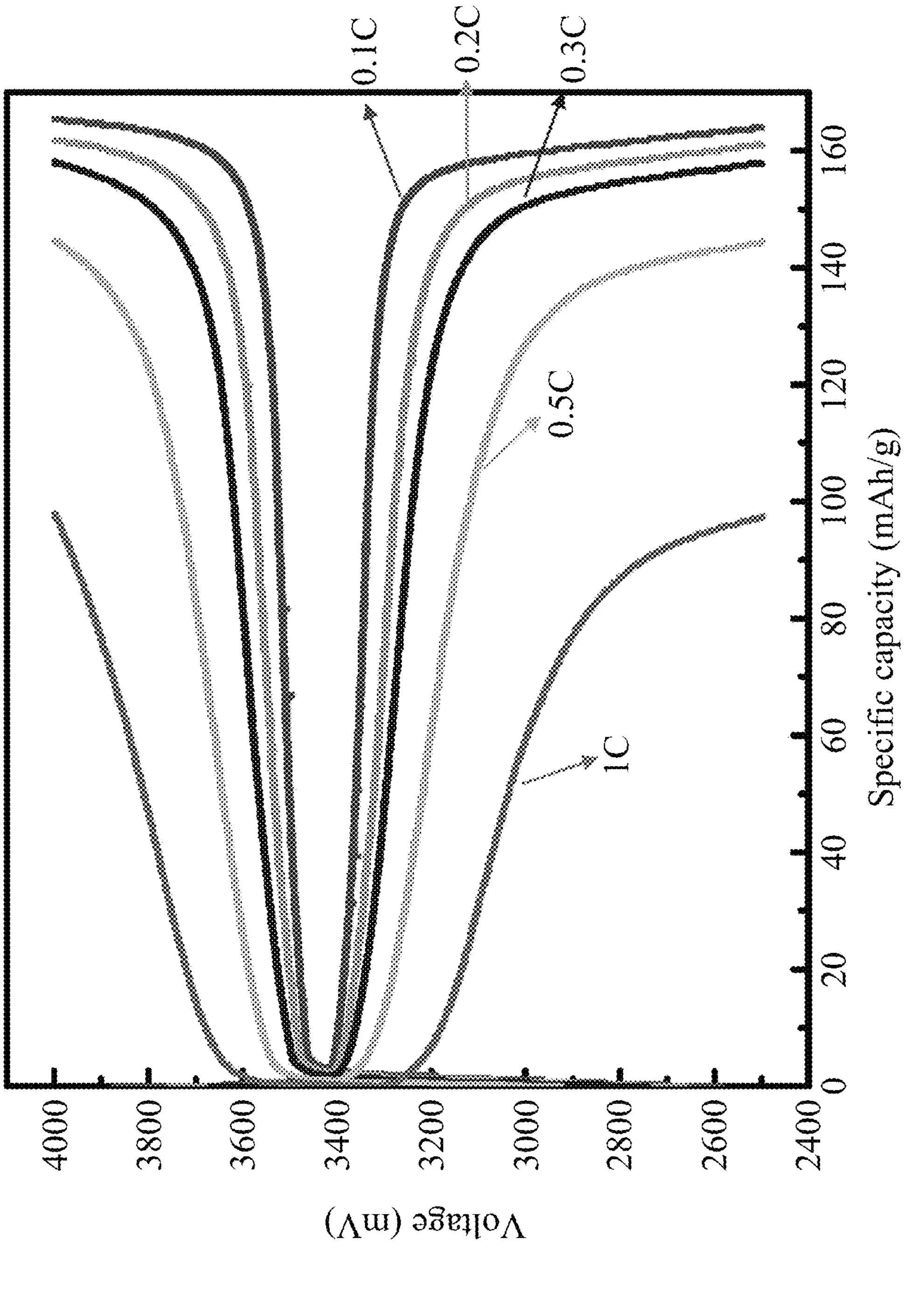
FIG. 5A is a capacity graph of the lithium-ion batteries of the Test Examples of the present disclosure at 25° C. and various charge-discharge rates.
Figure 5B:
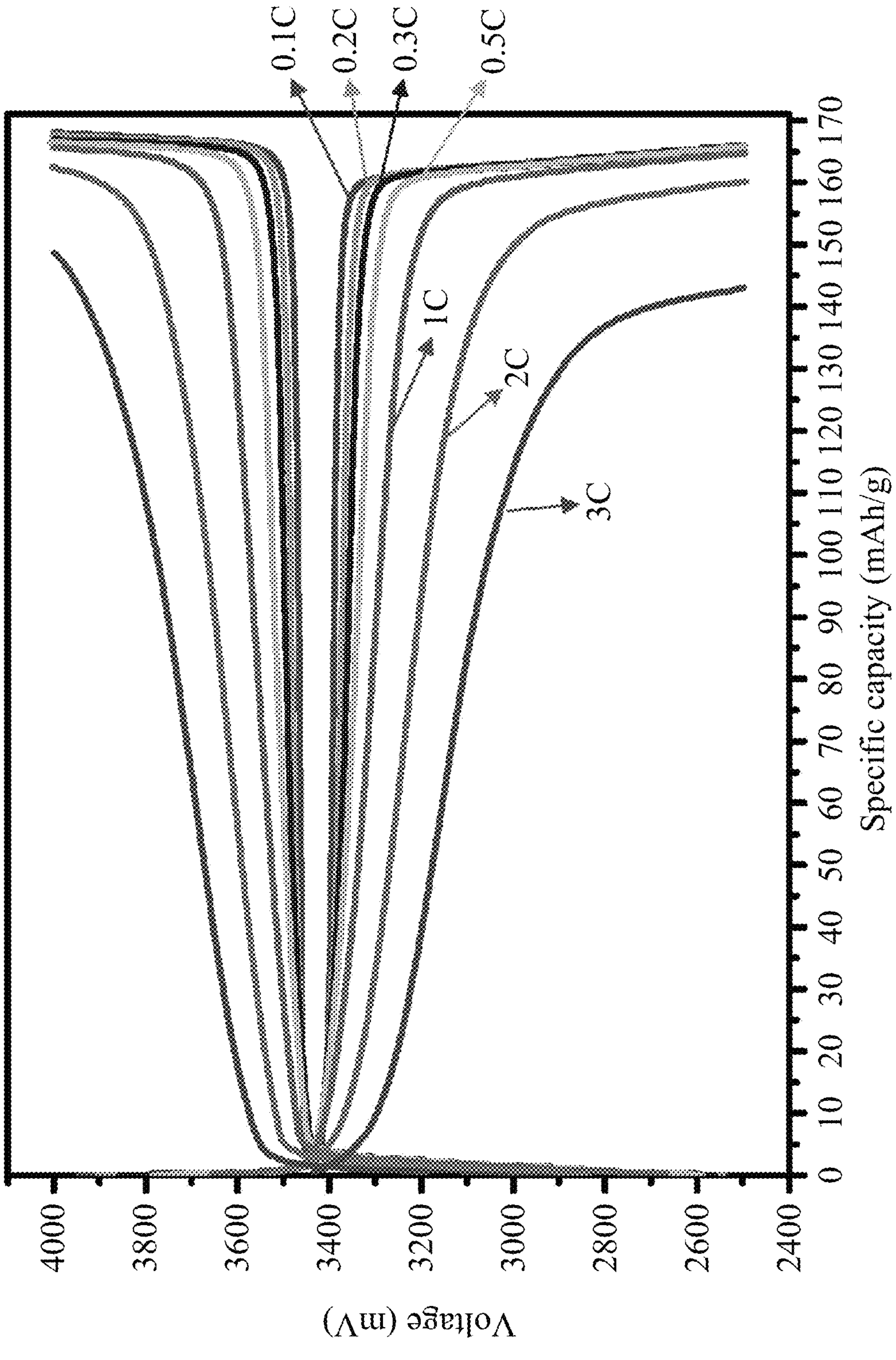
FIG. 5B is a capacity graph of the lithium-ion batteries of the Test Examples of the present disclosure at 60° C. and various charge-discharge rates.

Moreover, a battery capacity and a charge-discharge current of the lithium-ion battery were measured, and the charge-discharge curves within a voltage ranging from 2.5 to 4.0 V were obtained at 60° C. and a charge-discharge rate of 0.1 C, 0.2 C, 0.3 C, 0.5 C, 1 C, 2 C, and 3 C, based on the mass of the positive electrode material, and were recorded in FIG. 5B.

Figure 6A:
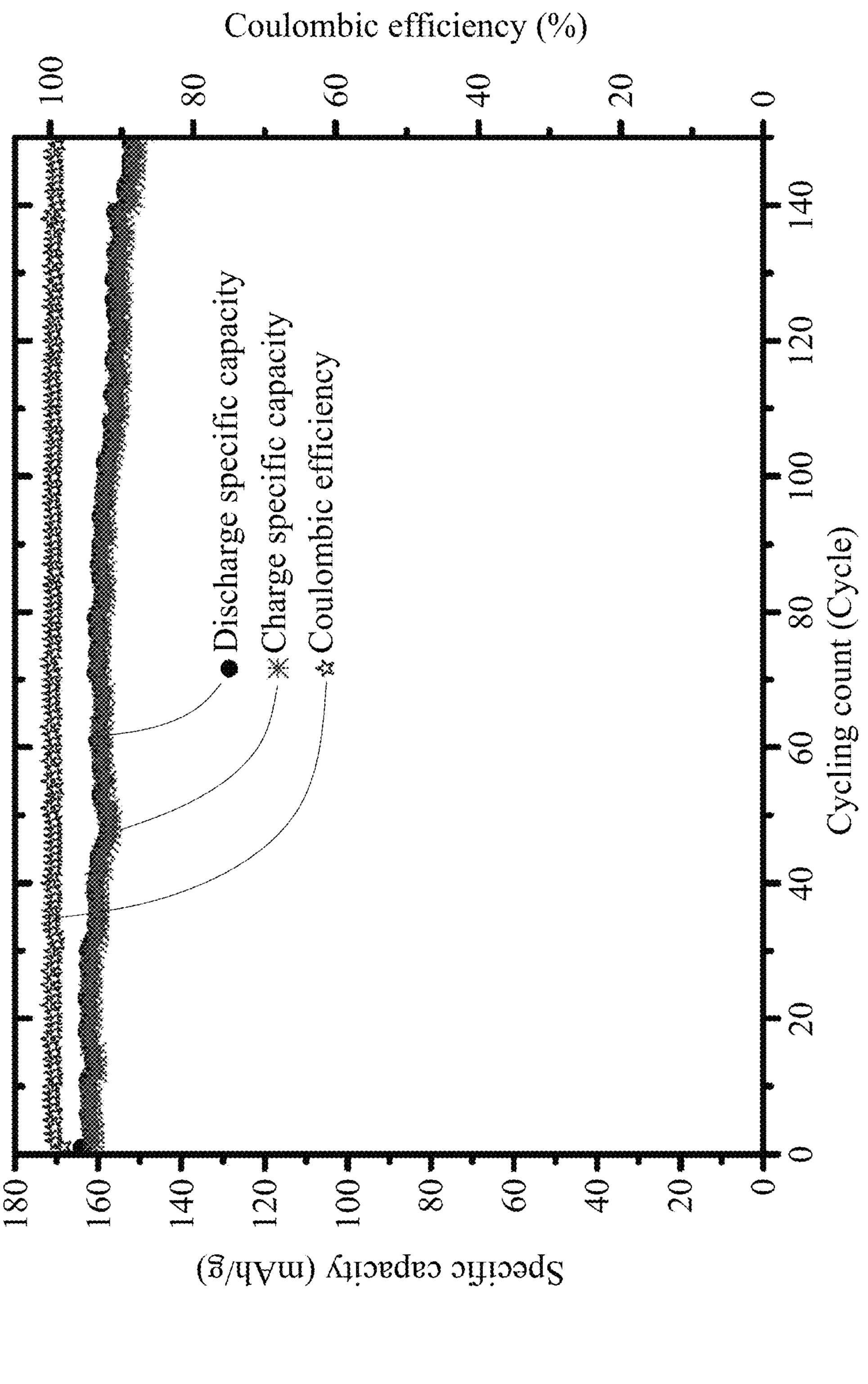
FIG. 6A is a graph of long-term charge-discharge cycling stability of the lithium-ion batteries of the Test Examples of the present disclosure at 25° C. and 0.2 C discharge rate.
Figure 6B:
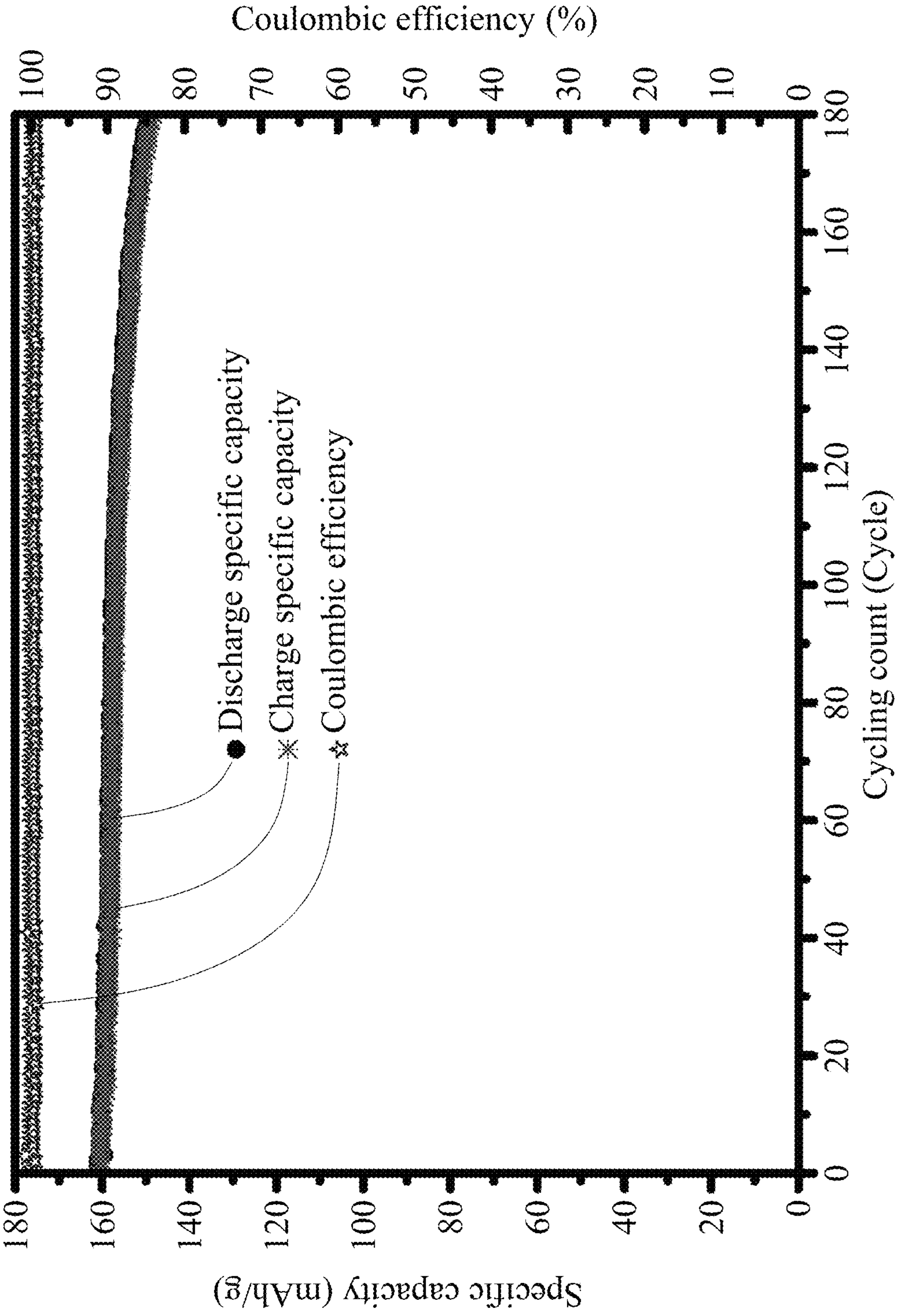
FIG. 6B is a graph of long-term charge-discharge cycling stability of the lithium-ion batteries of the Test Examples of the present disclosure at 60° C. and 0.2 C discharge rate.

Next, the capacity of the lithium-ion battery in each cycle was measured by repeated charge-discharge several times at 25° C. and 60° C. and a charge-discharge rate of 0.2 C, and was recorded respectively in FIGS. 6A and 6B.

Figure 6C:
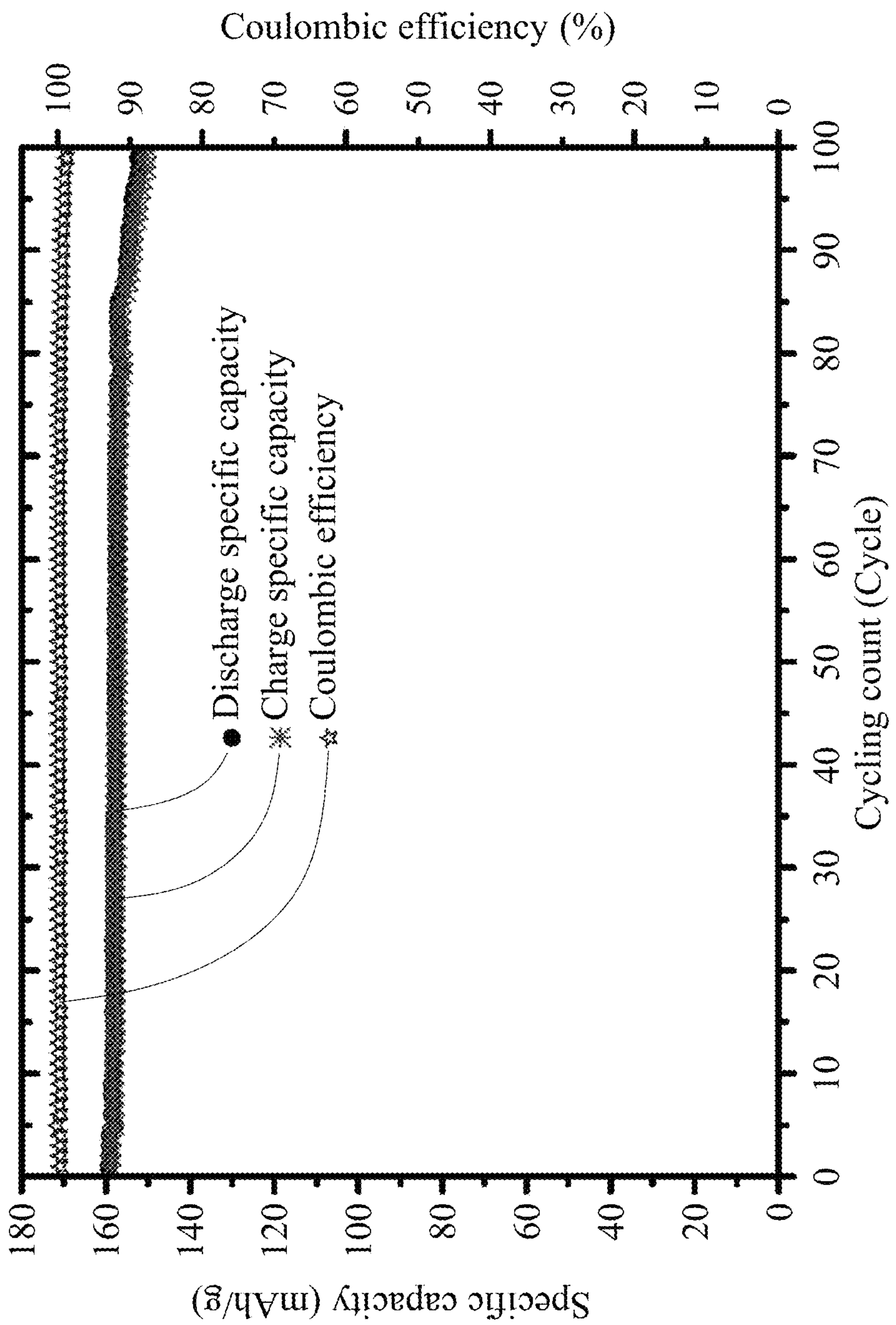
FIG. 6C is a graph of long-term charge-discharge cycling stability of the lithium-ion batteries of the Test Examples of the present disclosure at 60° C. and 0.5 C discharge rate.

Furthermore, the capacity of the lithium-ion battery in each cycle was measured by repeated charge-discharge several times at 60° C. and a charge-discharge rate of 0.5 C, and was recorded in FIG. 6C.

Comparative Test Example: Preparation of a Lithium-Ion Battery

The preparation method was the same as that of Test Example 1, except that the electrolyte composition of Example 3 was replaced by the electrolyte composition of Comparative Example. Measurements were performed in accordance with the aforementioned test method of charge-discharge capacity at 25° C. and 60° C., and the results were recorded in FIGS. 5C and 5D.

Figure 6D:
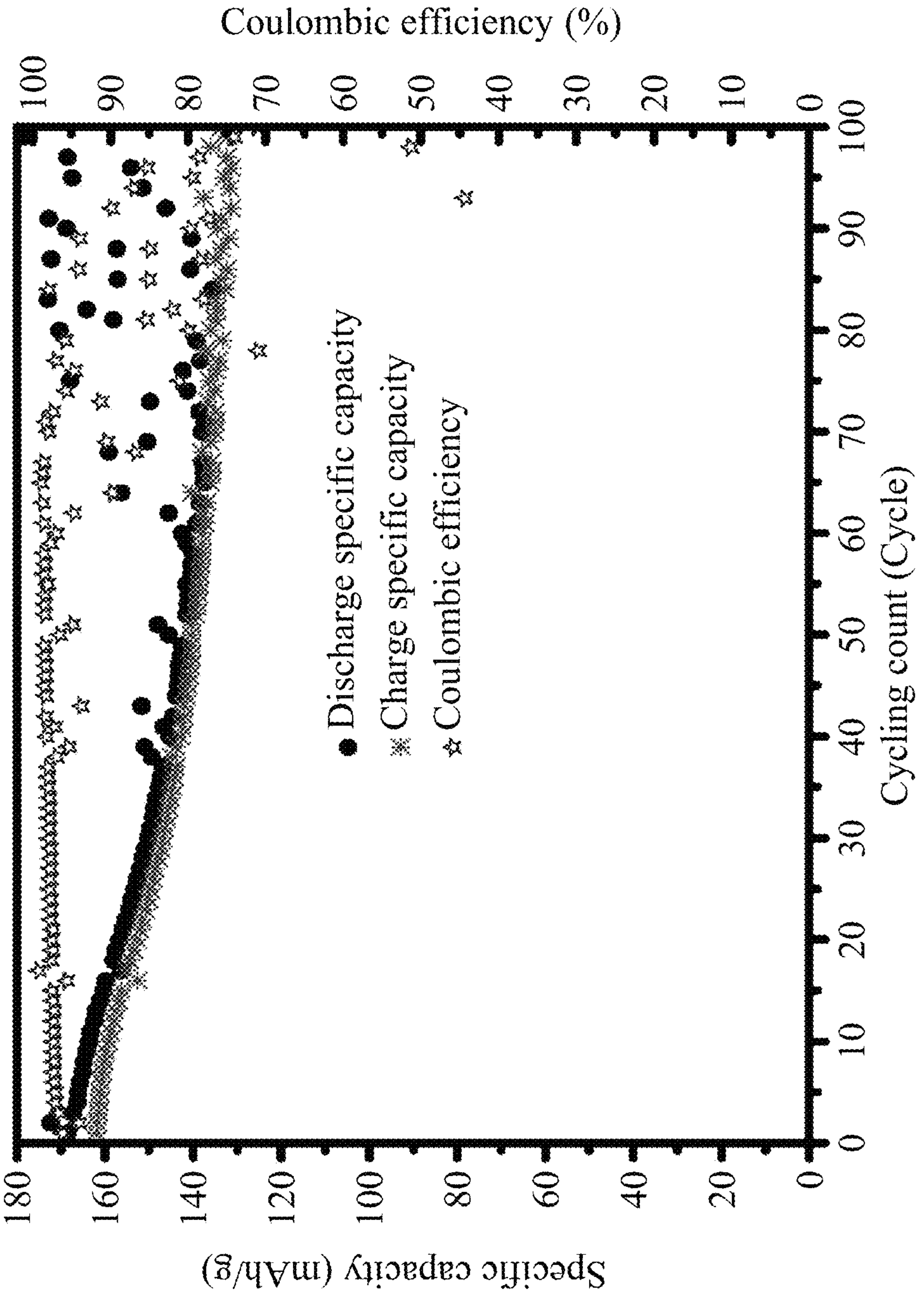
FIG. 6D is a graph of long-term charge-discharge cycling stability of the lithium-ion batteries of Comparative Test Examples at 60° C. and 0.2 C discharge rate.

Next, measurements were performed in accordance with the aforementioned test method of long-term charge-discharge cycling stability at 60° C. and a charge-discharge rate of 0.2 C, and the results were recorded in FIG. 6D.

Figure 5C:
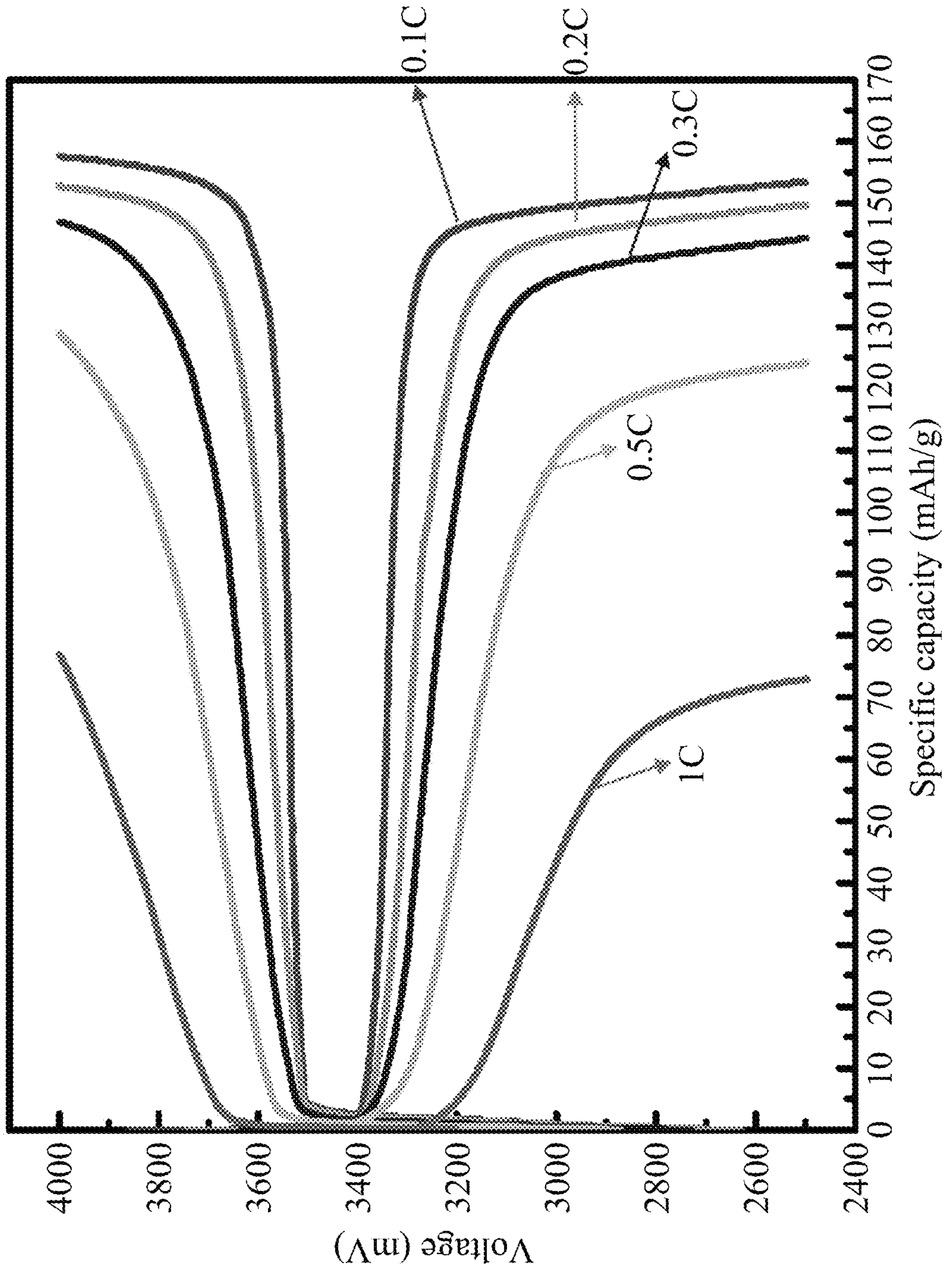
FIG. 5C is a capacity graph of the lithium-ion batteries of Comparative Test Examples at 25° C. and various charge-discharge rates.

It can be seen from the results of the charge-discharge curves in FIGS. 5A and 5C, compared with the lithium-ion battery of Comparative Test Example which charge-discharge capacity declined to 124 mAh/g at a charge-discharge rate of 0.5 C, the lithium-ion battery of Test Example of the present disclosure still had a charge-discharge capacity higher than 140 mAh/g at a charge-discharge rate of 0.5 C. The lithium-ion battery of Test Example of the present disclosure still had a charge-discharge capacity near 100 mAh/g at a charge-discharge rate of 1 C because the electrolyte in it had a dense crosslinked structure provided by the crosslinker of Example 3. It is clear that the prepared lithium-ion battery can effectively strengthen the capacity performance at a high charge-discharge rate because the crosslinker of the present disclosure was used in the electrolyte.

Figure 5D:
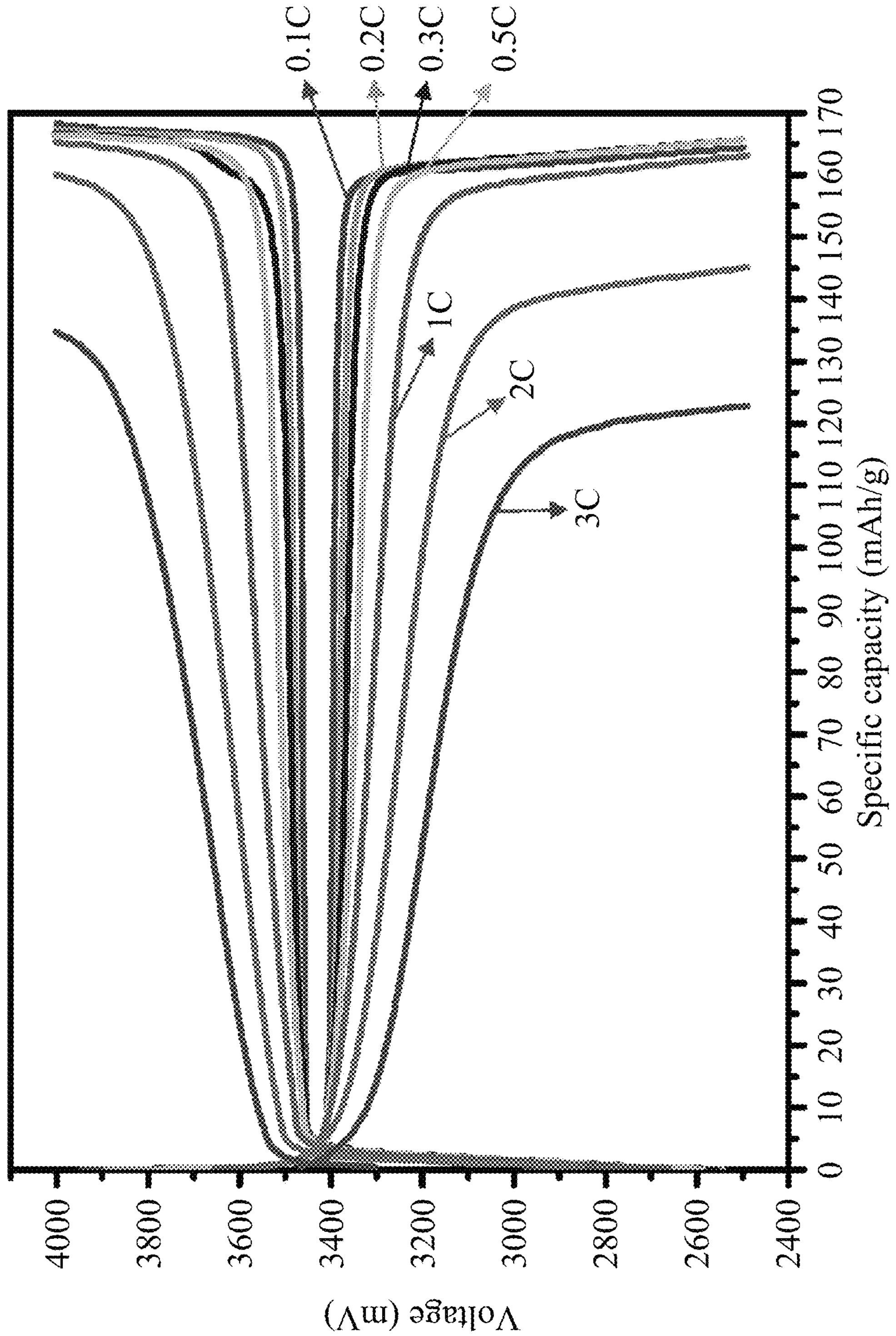
FIG. 5D is a capacity graph of the lithium-ion batteries of Comparative Test Examples at 60° C. and various charge-discharge rates.

It can be observed from the results of the charge-discharge curves in FIGS. 5B and 5D, compared with the lithium-ion battery of Comparative Test Example which charge-discharge capacity declined to 145 mAh/g at a charge-discharge rate of 2 C, the lithium-ion battery of Test Example of the present disclosure still had a charge-discharge capacity higher than 160 mAh/g. It is obvious that the prepared lithium-ion battery can effectively strengthen the capacity performance at a high temperature high charge-discharge rate because the crosslinker of the present disclosure was used in the electrolyte.

It can be observed from the results of the long-term charge-discharge cycling stability (60° C., 0.2 C charge-discharge rate) of FIGS. 6B and 6D, the lithium-ion battery of Comparative Test Example only maintained 82.4% of the initial capacity after 100 repeated charge-discharge cycles. Compared with the lithium-ion battery of Comparative Test Example, the lithium-ion battery of Test Example can undergo up to 180 repeated charge-discharge cycles and still maintain 92% of the initial capacity, because the electrolyte in it had a dense crosslinked structure provided by the crosslinker of Example 3.

Furthermore, it can be seen from FIGS. 6A and 6C that the capacity of the lithium-ion battery of Test Example of the present disclosure was 94% of the initial capacity after 150 charge-discharge cycles at 25° C. and a discharge rate of 0.2 C. And, the capacity of the lithium-ion battery of Test Example of the present disclosure was 95% of the initial capacity after 100 charge-discharge cycles at 60° C. and a discharge rate of 0.5 C. It is obvious that the prepared lithium-ion battery can effectively inhibit lithium dendrite formation, improve the physical property of the electrolyte, and thereby strengthen the lithium-ion battery cycling stability and extend its service life because the crosslinker of the present disclosure was used in the electrolyte.

In conclusion, through the addition of the crosslinker of formula (I), the ionic group of the crosslinker evenly distributes throughout the structure of the prepared electrolyte composition of the present disclosure, not only for the improvement of the ionic conductivity of the electrolyte composition but also as a localized reservoir for anions. Therefore, in a high current density environment, the imbalance of electric charge around the lithium metal electrode is eased and the formation of lithium dendrite is delayed.

On the other hand, via the dense crosslinked structure provided by the crosslinker of formula (I), the mechanical strength and heat resistance of the produced electrolyte composition are improved, and thereby the surface of the lithium metal electrode is kept uniform and the micro short circuit issue caused by punctures is avoided. The electrochemical stability of the lithium-ion battery and its long-term charge-discharge cycling stability are significantly improved, and its service life is also extended. Hence, the crosslinker has extremely high industrial applied value and market prospects.

The above Examples are merely illustrative, and are not intended to limit the present disclosure. Modifications and variations of the aforementioned Examples can be made by those skilled in the art without departing from the spirit and scope of the present disclosure. Therefore, the scope of the present disclosure is defined by the scope of the appended claims. As long as the effects and implementation purposes of the present disclosure are not affected, they should be encompassed in the present disclosure.

What is claimed is:

1. A crosslinker of formula (I) for electrolytes:

(I)

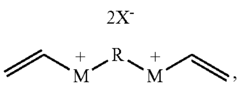

wherein M is selected from the group consisting of a monovalent imidazolium ion, a triazolium ion, a pyridinium ion, a substituted or unsubstituted phosphonium ion, and a substituted or unsubstituted ammonium ion;

R is ethyleneoxy, or polyphenylene; and

X is a monovalent halogen-containing anion, a carboxylate-containing anion, or a thiocyanate ion.

2. The crosslinker according to claim 1, wherein the Mis a moiety selected from the group consisting of the following:

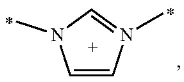 , 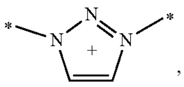 ,

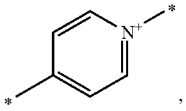 , 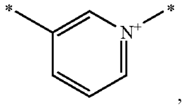 ,

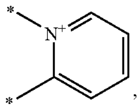 , 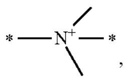 , and 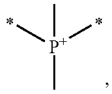 , wherein * represents a junction whereto the M couples to formula (I).

3. The crosslinker according to claim 1, wherein the M is a monovalent imidazolium ion, and the X is a monovalent halogen-containing anion.

4. The crosslinker according to claim 1, wherein the halogen-containing anion is an ion selected from the group consisting of a chloride ion, a bromide ion, a tetrafluoroborate ion, a hexafluorophosphate ion, a bis(trifluoromethylsulfonyl)imide anion, and a trifluoromethanesulfonate ion.

5. An electrolyte composition comprising a polymer crosslinked by the crosslinker according to claim 1, wherein the polymer is obtained from a reaction between a reactive monomer having an alkenyl or sulfhydryl group and an initiator, and based on a total weight of the electrolyte composition, a moiety of the crosslinker of formula (I) is contained in the crosslinked polymer in an amount from 1 to 25 wt %.

6. The electrolyte composition according to claim 5, further comprising an additive and an electrolyzable lithium salt.

7. The electrolyte composition according to claim 5, wherein a thermal degradation temperature of the electrolyte composition is from 100 to 282° C.

8. The electrolyte composition according to claim 5, wherein a stress of the electrolyte composition at −40% strain is from 0.029 to 0.064 MPa.

9. The electrolyte composition according to claim 5, wherein an electrical conductivity of the electrolyte composition is from $1.17\times10^{-4}$ to $1.52\times10^{-4}$ S/cm.

10. A method of preparing an electrolyte composition, comprising:

providing a reactive oligomer having an alkenyl or sulfhydryl group; and in a presence of an additive and an electrolyzable lithium salt, carrying out a free radical polymerization with the reactive oligomer, the crosslinker according to claim 1, and an initiator, so as to prepare the electrolyte composition.

11. The method according to claim 10, wherein a weight ratio of the crosslinker to the reactive oligomer is from 5:95 to 25:75.

12. The method according to claim 10, wherein the initiator is a thermal initiator and is a compound selected from the group consisting of azobisisobutyronitrile and 2,2-azobis (2-methylpropionamidine) dihydrochloride.

13. The method according to claim 12, wherein a temperature of the free radical polymerization is from 55 to 80° C., and a reaction time of the free radical polymerization is from 6 to 24 hours.

14. The method according to claim 10, wherein the initiator is a photo initiator and is a compound selected from the group consisting of 2,2-dimethoxy-2-phenylacetophenone, 2-hydroxy-2-methylpropiophenone, and 1-hydroxycyclohexyl phenyl ketone.

15. The method according to claim 14, wherein a wavelength range of a light source to carry out the free radical polymerization is from 350 to 400 nm, and a reaction time of the free radical polymerization is from 5 to 10 minutes.

16. The method according to claim 10, wherein the electrolyzable lithium salt is at least one compound selected from the group consisting of lithium bis(trifluoromethanesulphonyl)imide, lithium hexafluorophosphate, lithium bis (oxalate)borate, lithium tetrafluoroborate, lithium difluoro (oxalato)borate, lithium bis(fluorosulfonyl)imide, lithium difluorophosphate, and lithium tetrafluorooxalatophosphate.

17. The method according to claim 10, wherein the additive is at least one compound selected from the group consisting of polyethylene glycol dimethyl ether, butanedinitrile, and an ionic liquid.

18. A lithium-ion battery, comprising:

a positive electrode;

a negative electrode; and the electrolyte composition according to claim 5.

19. The lithium-ion battery according to claim 18, wherein the positive electrode is lithium iron phosphate.

20. The lithium-ion battery according to claim 18, wherein the negative electrode is lithium metal.

21. The lithium-ion battery according to claim 18, wherein a charge-discharge capacity of the lithium-ion battery is greater than 160 mAh/g at 60°° C., within a voltage range from 2.5 to 4.0 volts, and at a discharge rate from 1 to 2 C.

22. The lithium-ion battery according to claim 18, wherein a capacity of the lithium-ion battery is 90% or more of an initial capacity after 100 charge-discharge cycles, under a condition of 60° C. and a discharge rate from 0.2 to 0.5 C.

* * * * *